US012457232B2

United States Patent
Seo et al.

(10) Patent No.: US 12,457,232 B2
(45) Date of Patent: Oct. 28, 2025

(54) PACKET COLLECTION METHOD AND PACKET COLLECTION APPARATUS FOR VIRTUALIZATION CORE NETWORK SESSION MANAGEMENT

(71) Applicant: WINS Co., Ltd., Seongnam-si (KR)

(72) Inventors: Hyun Jong Seo, Seongnam-si (KR); Gu Min Nam, Anyang-si (KR)

(73) Assignee: WINS Co., Ltd., Seongnam-si (KR)

( * ) Notice: Subject to any disclaimer, the term of this patent is extended or adjusted under 35 U.S.C. 154(b) by 263 days.

(21) Appl. No.: 18/352,193

(22) Filed: Jul. 13, 2023

(65) Prior Publication Data

US 2024/0179165 A1   May 30, 2024

(30) Foreign Application Priority Data

Nov. 24, 2022   (KR) .................. 10-2022-0158916

(51) Int. Cl.
*H04L 9/40*   (2022.01)
*G06F 9/455*   (2018.01)
(Continued)

(52) U.S. Cl.
CPC ...... *H04L 63/1425* (2013.01); *G06F 9/45558* (2013.01); *H04L 63/1416* (2013.01); *H04L 67/142* (2013.01); *G06F 2009/45595* (2013.01)

(58) Field of Classification Search
CPC ............ H04L 63/1425; H04L 63/1416; H04L 67/142; H04L 43/20; H04L 43/02;
(Continued)

(56) References Cited

U.S. PATENT DOCUMENTS 9,178,807 B1 *   11/2015   Chua .................. H04L 45/22
2006/0253906 A1 *   11/2006   Rubin .................. H04L 63/20
                                                         726/23
(Continued)

FOREIGN PATENT DOCUMENTS

EP            2854347 A2 *   4/2015   ......... H04L 12/4633
KR       20140075846 A *   6/2014   ............ H04W 76/11
(Continued)

*Primary Examiner* — Emmanuel L Moise
*Assistant Examiner* — Berhanu Shitayewoldetadik
(74) *Attorney, Agent, or Firm* — BROADVIEW IP LAW, PC

(57) ABSTRACT

A packet collection apparatus for virtualization core network session management according to an embodiment of the present disclosure is a packet collection apparatus for virtualization core network session management including a mobile communication virtual machine, software-defined networking (SDN), and an attack detection device, wherein the packet collection apparatus for virtualization core network session management performs an operation (A) of transmitting a control-related packet to be transmitted via a session management unit of the attack detection device through the SDN when transmission of the control-related packet occurs in the mobile communication virtual machine, and the session management unit included in the attack detection device performs an operation (B) of extracting and collecting session information from the transmitted control-related packet.

18 Claims, 37 Drawing Sheets

(51) Int. Cl.
    *H04L 12/24*     (2006.01)
    *H04L 12/26*     (2006.01)
    *H04L 15/16*     (2006.01)
    *H04L 29/08*     (2006.01)
    *H04L 67/142*     (2022.01)
    *H04W 72/04*     (2023.01)

(58) Field of Classification Search
    CPC ................ H04L 67/14; G06F 9/45558; G06F 2009/45595; H04W 88/14
    USPC .......................................................... 726/23
    See application file for complete search history.

(56) References Cited

U.S. PATENT DOCUMENTS

| | | | |
|---|---|---|---|
| 2014/0241247 A1* | 8/2014 | Kempf | H04W 76/12 370/328 |
| 2015/0296549 A1* | 10/2015 | Jin | H04L 65/1073 370/241 |
| 2016/0142427 A1* | 5/2016 | de los Reyes | H04L 63/1441 726/23 |
| 2017/0126714 A1* | 5/2017 | Nooka | H04L 63/1425 |
| 2017/0237629 A1* | 8/2017 | Sobania | H04L 43/14 370/252 |
| 2019/0014496 A1* | 1/2019 | Kim | H04W 28/088 |
| 2019/0274185 A1* | 9/2019 | Stojanovski | H04L 47/2441 |
| 2021/0117360 A1* | 4/2021 | Kutch | G06F 3/0656 |

FOREIGN PATENT DOCUMENTS

| | | | | |
|---|---|---|---|---|
| KR | 10-1541348 B1 | 8/2015 | | |
| WO | WO-2020130321 A1 * | 6/2020 | ............. | H04L 45/02 |
| WO | WO-2021020934 A1 * | 2/2021 | ............. | H04W 4/48 |

\* cited by examiner

FIG. 7

| CLASSIFICATION OF CORE NETWORKS | COMMUNICATION SECTION | | SDN SECTION | | PACKET COLLECTION SECTION | | COLLECTION SECTION | PROTOCOL | VIA |
|---|---|---|---|---|---|---|---|---|---|
| | SOURCE | DESTINATION | IN | OUT | SOURCE | DESTINATION | | | |
| 3G | UE | INTERNET | SGSN_Iu | GGSN_Gi | SGSN_GnU | GGSN_GnU | GnU | GTP-U | ATTACK DETECTION UNIT |
| | INTERNET | UE | GGSN_Gi | SGSN_Iu | GGSN_GnU | SGSN_GnU | GnU | GTP-U | ATTACK DETECTION UNIT |
| | SGSN | GGSN | SGSN_GnC | GGSN_GnC | SGSN_GnC | GGSN_GnC | GnC | GTPv1-C | SESSION MANAGEMENT UNIT |
| | GGSN | SGSN | GGSN_GnC | SGSN_GnC | GGSN_GnC | SGSN_GnC | GnC | GTPv1-C | SESSION MANAGEMENT UNIT |
| 4G | UE | INTERNET | S-GW_S1-U | P-GW_SGi | S-GW_S5/8U | P-GW_S5/8U | S5/8U | GTP-U | ATTACK DETECTION UNIT |
| | INTERNET | UE | P-GW_SGi | S-GW_S1-U | P-GW_S5/8U | S-GW_S5/8U | S5/8U | GTP-U | ATTACK DETECTION UNIT |
| | S-GW | P-GW | S-GW_S5/8C | P-GW_S5/8C | S-GW_S5/8C | P-GW_S5/8C | S5/8C | GTPv2-C | SESSION MANAGEMENT UNIT |
| | P-GW | S-GW | P-GW_S5/8C | S-GW_S5/8C | P-GW_S5/8C | S-GW_S5/8C | S5/8C | GTPv2-C | SESSION MANAGEMENT UNIT |
| 5G | UE | INTERNET | AN_N3 | UPF_N6 | AN_N3 | UPF_N3 | N3 | GTP-U | ATTACK DETECTION UNIT |
| | INTERNET | UE | UPF_N6 | AN_N3 | UPF_N3 | AN_N3 | N3 | GTP-U | ATTACK DETECTION UNIT |
| | AMF | SMF | AMF_N11 | SMF_N11 | AMF_N11 | SMF_N11 | N11 | HTTP, HTTP2 | SESSION MANAGEMENT UNIT |
| | SMF | AMF | SMF_N11 | AMF_N11 | SMF_N11 | AMF_N11 | N11 | HTTP, HTTP2 | SESSION MANAGEMENT UNIT |

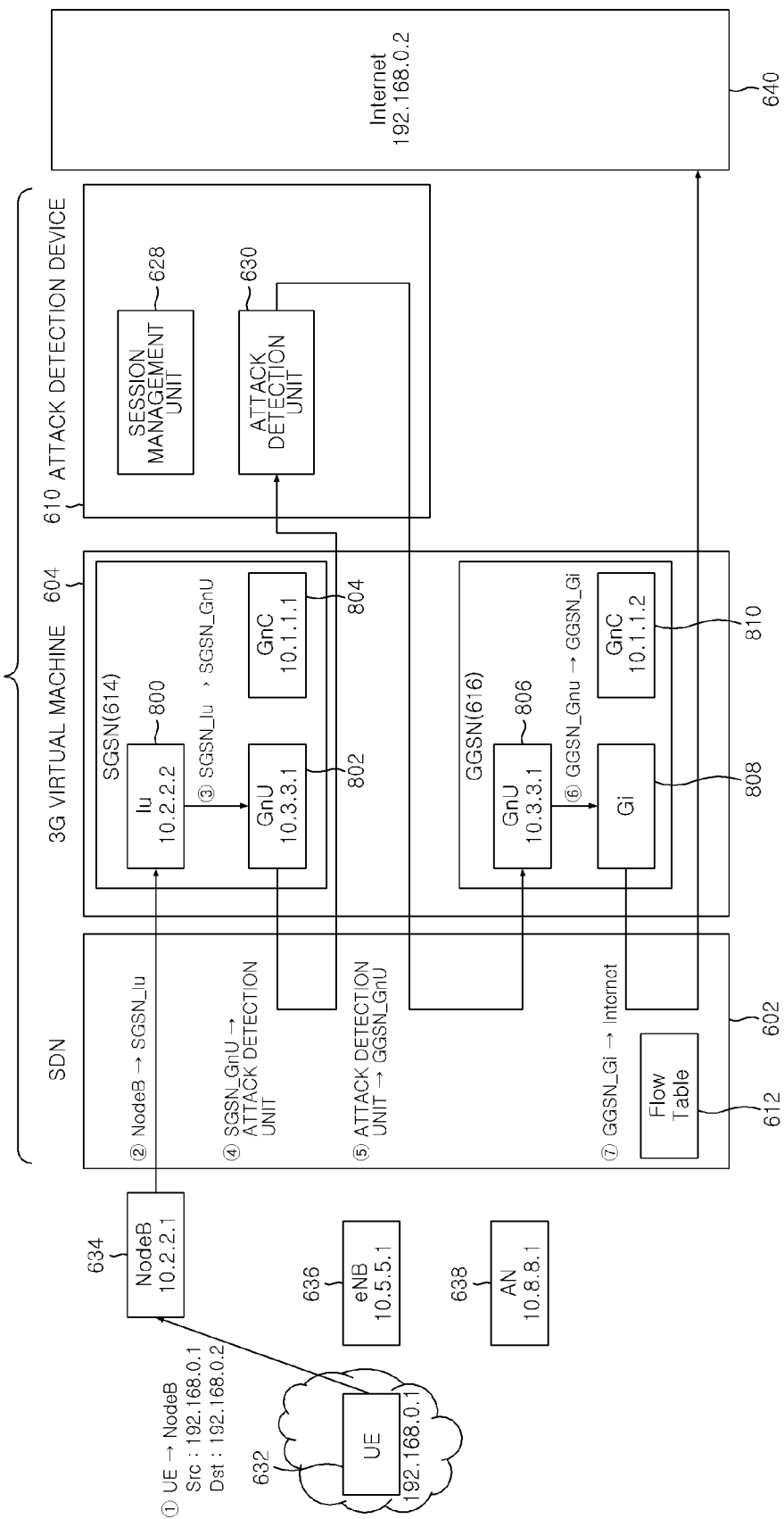

(3G Internet → UE)

(3G SGSN → GGSN)

(3G GGSN → SGSN)

(4G UE → Internet)

(4G S-GW → P-GW)

(5G UE → Internet)

(5G Internet → UE)

(5G AMF → SMF)

FIG. 23

| CLASSIFICATION OF CORE NETWORKS | COMMUNICATION SECTION | | SDN SECTION | | PACKET COLLECTION SECTION | | | PROTOCOL | VIA |
|---|---|---|---|---|---|---|---|---|---|
| | SOURCE | DESTINATION | IN | OUT | SOURCE | DESTINATION | COLLECTION SECTION | | |
| 3G | UE | INTERNET | SGSN_Iu | GGSN_Gi | SGSN_GnU | GGSN_GnU | GnU | GTP-U | 3G ATTACK DETECTION UNIT |
| | INTERNET | UE | GGSN_Gi | SGSN_Iu | GGSN_GnU | SGSN_GnU | GnU | GTP-U | 3G ATTACK DETECTION UNIT |
| | SGSN | GGSN | SGSN_GnC | GGSN_GnC | SGSN_GnC | GGSN_GnC | GnC | GTPv1-C | 3G SESSION MANAGEMENT UNIT |
| | GGSN | SGSN | GGSN_GnC | SGSN_GnC | GGSN_GnC | SGSN_GnC | GnC | GTPv1-C | 3G SESSION MANAGEMENT UNIT |
| 4G | UE | INTERNET | S-GW_S1-U | P-GW_SGi | S-GW_S5/8U | P-GW_S5/8U | S5/8U | GTP-U | 4G ATTACK DETECTION UNIT |
| | INTERNET | UE | P-GW_SGi | S-GW_S1-U | P-GW_S5/8U | S-GW_S5/8U | S5/8U | GTP-U | 4G ATTACK DETECTION UNIT |
| | S-GW | P-GW | S-GW_S5/8C | P-GW_S5/8C | S-GW_S5/8C | P-GW_S5/8C | S5/8C | GTPv2-C | 4G SESSION MANAGEMENT UNIT |
| | P-GW | S-GW | P-GW_S5/8C | S-GW_S5/8C | P-GW_S5/8C | S-GW_S5/8C | S5/8C | GTPv2-C | 4G SESSION MANAGEMENT UNIT |
| 5G | UE | INTERNET | AN_N3 | UPF_N6 | AN_N3 | UPF_N3 | N3 | GTP-U | 5G ATTACK DETECTION UNIT |
| | INTERNET | UE | UPF_N6 | AN_N3 | UPF_N3 | AN_N3 | N3 | GTP-U | 5G ATTACK DETECTION UNIT |
| | AMF | SMF | AMF_N11 | SMF_N11 | AMF_N11 | SMF_N11 | N11 | HTTP, HTTP2 | 5G SESSION MANAGEMENT UNIT |
| | SMF | AMF | SMF_N11 | AMF_N11 | SMF_N11 | AMF_N11 | N11 | HTTP, HTTP2 | 5G SESSION MANAGEMENT UNIT |

(3G UE → Internet)

(3G Internet → UE)

(3G SGSN → GGSN)

(3G GGSN → SGSN)

(4G UE → Internet)

(4G Internet → UE)

(4G S-GW → P-GW)

(4G P-GW → S-GW)

(5G UE → Internet)

(5G Internet → UE)

(5G AMF → SMF)

(5G SMF → AMF)

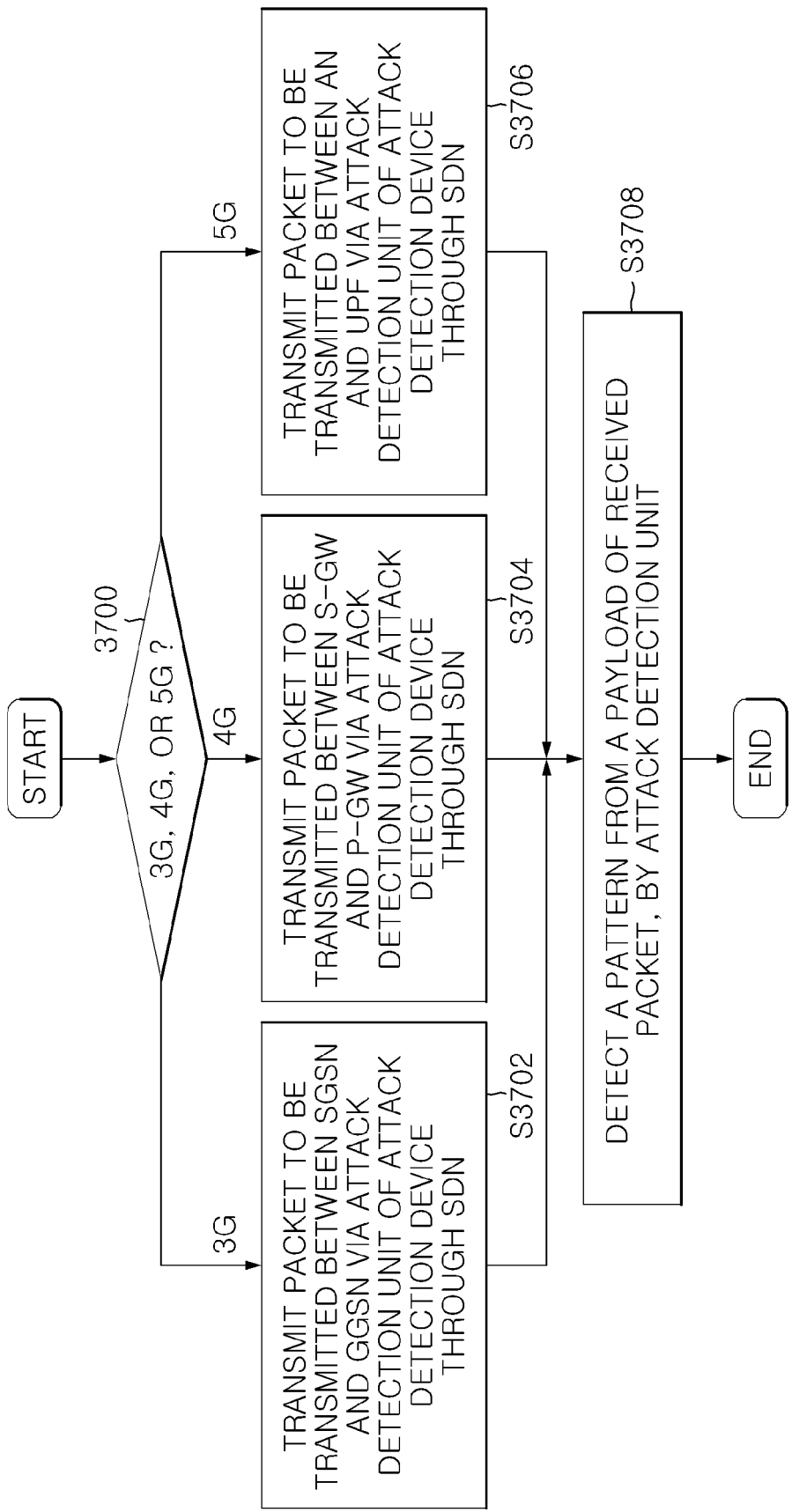

PACKET COLLECTION METHOD AND PACKET COLLECTION APPARATUS FOR VIRTUALIZATION CORE NETWORK SESSION MANAGEMENT

CROSS-REFERENCE TO RELATED APPLICATION(S)

This application is based on and claims priority under 35 U.S.C. 119 to Korean Patent Application No. 10-2022-0158916, filed on Nov. 24, 2022, in the Korean Intellectual Property Office, the disclosure of which is herein incorporated by reference in its entirety.

BACKGROUND OF THE INVENTION

Field of the Invention

The present disclosure relates to a packet collection method and a packet collection apparatus for virtualization core network session management.

Description of the Prior Art

A user equipment (UE) is dynamically allocated an IP address from a mobile core network (3G, 4G, or 5G) that the UE desires to access for a service, and is connected to an external Internet network to operate. Here, an IP packet is transmitted through a GPRS tunneling protocol (GTP) tunnel.

The GTP tunnel is established for each terminal session through control signaling when the UE initially accesses the mobile core network. After the session is established, data and information are transmitted through the GTP tunnel only with unique tunnel identification information (tunnel endpoint ID: TEID).

A control signal refers to traffic in a section between a plurality of devices, such as a serving GPRS support node (SGSN) and a gateway GPRS support node (GGSN) of 3G, a serving gateway (S-GW), a packet data network gateway (P-GW), and a base station (gNB) of 4G, and an access and mobility management function (AMF), a session management function (SMF), and a user plane function (UPF) of 5G.

In a virtualized mobile core network environment, since control signals perform communication without passing through a separate cable, methods for analysis are limited. In this specification, a mobile core network and a mobile core net may be used to have the same meaning.
Therefore, a technique for supporting terminal session management through a virtualized security device that analyzes traffic in Gn, S5/8, N3, and N11 sections transmitted between virtualized mobile core network devices, identifying a target of an attack using a GTP tunnel with corresponding information, maintaining and managing a session being used even though a handover occurs due to a network characteristic, and maintaining a terminal session regardless of 3G, 4G, or 5G in a mobile core network environment is required.

RELATED DOCUMENT

Patent document 1: KR 10-1541348 B1

SUMMARY OF THE INVENTION

An aspect of the present disclosure is to provide a packet collection method and a packet collection apparatus for virtualization core network session management that are capable of supporting terminal session management through a virtualized security device that analyzes traffic in Gn, S5/8, N3, and N11 sections transmitted between virtualized mobile core network devices.

Another aspect of the present disclosure is to provide a packet collection method and a packet collection apparatus for virtualization core network session management that are capable of identifying a target of an attack using a GTP tunnel, maintaining and managing a session being used even though a handover occurs due to a network characteristic, and maintaining a terminal session regardless of 3G, 4G, or 5G in a mobile core network environment.

To achieve the foregoing aspect, a packet collection method for virtualization core network session management according to an embodiment of the present disclosure,
as a packet collection method for virtualization core network session management performed by a packet collection apparatus for virtualization core network session management, may include:
an operation (A) of transmitting a control-related packet to be transmitted via a session management unit of an attack detection device through software-defined networking (SDN) when transmission of the control-related packet occurs in a mobile communication virtual machine; and
an operation (B) of the session management unit extracting and collecting session information from the control-related packet received through the SDN.

In the packet collection method for virtualization core network session management according to an embodiment of the present disclosure, the mobile communication virtual machine may include a 3G virtual machine, a 4G virtual machine, and a 5G virtual machine, and
the operation (A) may include:
an operation (A-1) of transmitting a control-related packet to be transmitted between a serving GPRS support node (SGSN) and a gateway GPRS support node (GGSN) of the 3G virtual machine via the session management unit of the attack detection device through the SDN;
an operation (A-2) of transmitting a control-related packet to be transmitted between a serving gateway (S-GW) and a packet data network gateway (P-GW) of the 4G virtual machine via the session management unit of the attack detection device through the SDN; and
an operation (A-3) of transmitting a control-related packet to be transmitted between an access and mobility management function (AMF) and a session management function (SMF) of the 5G virtual machine via the session management unit of the attack detection device through the SDN.

The packet collection method for virtualization core network session management according to an embodiment of the present disclosure may further include
an operation (C) of the session management unit forming a session chain, based on the collected session information, after the operation (B).

the packet collection method for virtualization core network session management according to an embodiment of the present disclosure may further include, after the operation (A-3):
an operation (D) of the packet collection apparatus for virtualization core network session management transmitting a user data-related packet to be transmitted via an attack detection unit of the attack detection device through the SDN when transmission of the user data-related packet occurs in the mobile communication virtual machine; and an operation (E) of the attack detection unit detecting a pattern from a payload of the packet received through the SDN.

In the packet collection method for virtualization core network session management according to an embodiment of the present disclosure, the operation (D) may include:

an operation (D-1) of transmitting a user data-related packet to be transmitted between the SGSN and the GGSN via the attack detection unit of the attack detection device through the SDN;

an operation (D-2) of transmitting a user data-related packet to be transmitted between the S-GW and the P-GW via the attack detection unit of the attack detection device through the SDN; and an operation (D-3) of transmitting a user data-related packet to be transmitted between a base station and a user plane function (UPF) via the attack detection unit of the attack detection device through the SDN.

In the packet collection method for virtualization core network session management according to an embodiment of the present disclosure, the control-related packet to be transmitted between the SGSN and the GGSN in the operation (A-1) may include a packet of a GnC section, the control-related packet to be transmitted between the S-GW and the P-GW in the operation (A-2) may include a packet of an S5/8C section, and the control-related packet to be transmitted between the AMF and the SMF in the operation (A-3) may include a packet of an N11 section.

In the packet collection method for virtualization core network session management according to an embodiment of the present disclosure, the user data-related packet to be transmitted between the SGSN and the GGSN in the operation (D-1) may include a packet of a GnU section, the user data-related packet to be transmitted between the S-GW and the P-GW in the operation (D-2) may include a packet of an S5/8U section, and the user data-related packet to be transmitted between the base station and the UPF in the operation (D-3) may include a packet of an N3 section.

In the packet collection method for virtualization core network session management according to an embodiment of the present disclosure, the session chain may include:

an uplink control-GTPC chain that stores uplink control-related data by each session, based on an input 3G or 4G session-related packet;

a downlink control-GTPC chain that stores downlink control-related data by each session;

a UE IP chain that stores a UE IP by each session;

a UE table chain that stores UE-related data by each session;

an uplink data-GTPU chain that stores uplink data by each session;

a downlink data-GTPU chain that stores downlink data by each session; and a UE session management context chain that stores a UE session management context by each session, based on an input 5G session-related packet.

In the packet collection method for virtualization core network session management according to an embodiment of the present disclosure, the uplink control-GTPC chain, the downlink control-GTPC chain, the UE IP chain, the UE table chain, the uplink data-GTPU chain, the downlink data-GTPU chain, and the UE session management context chain may be connected to each other so that a related session may be retrieved through a UE IP or a UE session management context.

In the packet collection method for virtualization core network session management according to an embodiment of the present disclosure, the SDN may include a flow table in which a flow between the SGSN, the GGSN, and the session management unit, a flow between the SGSN, the GGSN, and the attack detection unit, a flow between the S-GW, the P-GW, and the session management unit, a flow between the S-GW, the P-GW, and the attack detection unit, a flow between the AMF, the SMF, and the session management unit, and a flow between the base station, the UPF, and the attack detection unit are defined based on an input port of the SDN, an output port of the SDN, a source of a packet, and a destination of the packet.

In the packet collection method for virtualization core network session management according to an embodiment of the present disclosure, the attack detection device may be used in common for the 3G virtual machine, the 4G virtual machine, and the 5G virtual machine.

In the packet collection method for virtualization core network session management according to an embodiment of the present disclosure, the attack detection device may be present as one attack detection device for each of the 3G virtual machine, the 4G virtual machine, and the 5G virtual machine.

To achieve the foregoing aspect, a packet collection apparatus for virtualization core network session management according to an embodiment of the present disclosure may be a packet collection apparatus for virtualization core network session management including a mobile communication virtual machine, software-defined networking (SDN), and an attack detection device, wherein the packet collection apparatus for virtualization core network session management may perform an operation (A) of transmitting a control-related packet to be transmitted via a session management unit of the attack detection device through the SDN when transmission of the control-related packet occurs in the mobile communication virtual machine, and the session management unit included in the attack detection device may perform an operation (B) of extracting and collecting session information from the control-related packet received through the SDN.

In the packet collection apparatus for virtualization core network session management according to an embodiment of the present disclosure, the mobile communication virtual machine may include a 3G virtual machine, a 4G virtual machine, and a 5G virtual machine, and the operation (A) may include:

an operation (A-1) of transmitting a control-related packet to be transmitted between a serving GPRS support node (SGSN) and a gateway GPRS support node (GGSN) of the 3G virtual machine via the session management unit of the attack detection device through the SDN;

an operation (A-2) of transmitting a control-related packet to be transmitted between a serving gateway (S-GW) and a packet data network gateway (P-GW) of the 4G virtual machine via the session management unit of the attack detection device through the SDN; and an operation (A-3) of transmitting a control-related packet to be transmitted between an access and mobility management function (AMF) and a session management function (SMF) of the 5G virtual machine via the session management unit of the attack detection device through the SDN.

In the packet collection apparatus for virtualization core network session management according to an embodiment of the present disclosure, the session management unit may further perform an operation (C) of forming a session chain, based on the collected session information, after the operation (B).

In the packet collection apparatus for virtualization core network session management according to an embodiment of the present disclosure, after the operation (A-3), the packet collection apparatus for virtualization core network session management may further perform an operation (D) of transmitting a user data-related packet to be transmitted via an attack detection unit of the attack detection device through the SDN when transmission of the user data-related packet occurs in the mobile communication virtual machine, and the attack detection unit may further perform an operation (E) of detecting a pattern from a payload of the packet received through the SDN.

In the packet collection apparatus for virtualization core network session management according to an embodiment of the present disclosure, the operation (D) may include:

an operation (D-1) of transmitting a user data-related packet to be transmitted between the SGSN and the GGSN via the attack detection unit of the attack detection device through the SDN;

an operation (D-2) of transmitting a user data-related packet to be transmitted between the S-GW and the P-GW via the attack detection unit of the attack detection device through the SDN; and an operation (D-3) of transmitting a user data-related packet to be transmitted between a base station and a user plane function (UPF) via the attack detection unit of the attack detection device through the SDN.

In the packet collection apparatus for virtualization core network session management according to an embodiment of the present disclosure, the control-related packet to be transmitted between the SGSN and the GGSN in the operation (A-1) may include a packet of a GnC section.

the control-related packet to be transmitted between the S-GW and the P-GW in the operation (A-2) may include a packet of an S5/8C section, and the control-related packet to be transmitted between the AMF and the SMF in the operation (A-3) may include a packet of an N11 section.

In the packet collection apparatus for virtualization core network session management according to an embodiment of the present disclosure, the user data-related packet to be transmitted between the SGSN and the GGSN in the operation (D-1) may include a packet of a GnU section, the user data-related packet to be transmitted between the S-GW and the P-GW in the operation (D-2) may include a packet of an S5/8U section, and the user data-related packet to be transmitted between the base station and the UPF in the operation (D-3) may include a packet of an N3 section.

In the packet collection apparatus for virtualization core network session management according to an embodiment of the present disclosure, the session chain may include:

an uplink control-GTPC chain that stores uplink control-related data by each session, based on an input 3G or 4G session-related packet;

a downlink control-GTPC chain that stores downlink control-related data by each session;

a UE IP chain that stores a UE IP by each session;

a UE table chain that stores UE-related data by each session;

an uplink data-GTPU chain that stores uplink data by each session;

a downlink data-GTPU chain that stores downlink data by each session; and a UE session management context chain that stores a UE session management context by each session, based on an input 5G session-related packet.

In the packet collection apparatus for virtualization core network session management according to an embodiment of the present disclosure, the uplink control-GTPC chain, the downlink control-GTPC chain, the UE IP chain, the UE table chain, the uplink data-GTPU chain, the downlink data-GTPU chain, and the UE session management context chain may be connected to each other so that a related session may be retrieved through a UE IP or a UE session management context.

In the packet collection apparatus for virtualization core network session management according to an embodiment of the present disclosure, the SDN may include a flow table in which a flow between the SGSN, the GGSN, and the session management unit, a flow between the SGSN, the GGSN, and the attack detection unit, a flow between the S-GW, the P-GW, and the session management unit, a flow between the S-GW, the P-GW, and the attack detection unit, a flow between the AMF, the SMF, and the session management unit, and a flow between the base station, the UPF, and the attack detection unit are defined based on an input port of the SDN, an output port of the SDN, a source of a packet, and a destination of the packet.

In the packet collection apparatus for virtualization core network session management according to an embodiment of the present disclosure, the attack detection device may be used in common for the 3G virtual machine, the 4G virtual machine, and the 5G virtual machine.

In the packet collection apparatus for virtualization core network session management according to an embodiment of the present disclosure, the attack detection device may be present as one attack detection device for each of the 3G virtual machine, the 4G virtual machine, and the 5G virtual machine.

According to a packet collection method and a packet collection apparatus for virtualization core network session management according to an embodiment of the present disclosure, it is possible to manage a terminal session by analyzing control traffic of a mobile core network through a virtualized security device in a virtualized mobile core network environment (3G, 4G, and 5G).

Mobile communication technology continues to evolve in accordance with 3G, 4G, and 5G standardization. A packet collection method and a packet collection apparatus for virtualization core network session management according to an embodiment of the present disclosure may process a control message and may manage a session without being affected by an environmental configuration, thereby simplifying branching according to core network changes and maximizing flexibility of a network device. This flexibility makes it possible to control a terminal even in a virtualized mobile core network environment (3G, 4G, and 5G) due to a characteristic of a network, thus facilitating an operation, such as traffic analysis and tracking using a session.

Further, according to a packet collection method and a packet collection apparatus for virtualization core network session management according to an embodiment of the present disclosure, it is possible to support terminal session management through a virtualized security device that analyzes traffic in Gn, S5/8, N3, and N11 sections transmitted between virtualized mobile core network devices.

In addition, according to a packet collection method and a packet collection apparatus for virtualization core network session management according to an embodiment of the present disclosure, it is possible to identify a target of an attack using a GTP tunnel, maintain and manage a session being used even though a handover occurs due to a network characteristic, and maintaining a terminal session regardless of 3G, 4G, or 5G in a mobile core network environment.

BRIEF DESCRIPTION OF THE DRAWINGS

The above and other aspects, features, and advantages of the present disclosure will be more apparent from the following detailed description taken in conjunction with the accompanying drawings, in which:

FIG. 7 illustrates a flow configuration of a flow table included in SDN in the packet collection apparatus for virtualization core network session management according to the first embodiment of the present disclosure;

FIG. 8 illustrates an operation in packet flow from a UE to an Internet in 3G according to the first embodiment of the present disclosure;

FIG. 23 illustrates a flow configuration of a flow table included in SDN in the packet collection apparatus for virtualization core network session management according to the second embodiment of the present disclosure;

FIG. 37 is a flowchart illustrating a pattern detection-related method of a packet collection method for virtualization core network session management according to an embodiment of the present disclosure.

DETAILED DESCRIPTION OF THE EMBODIMENTS

Figure 1:
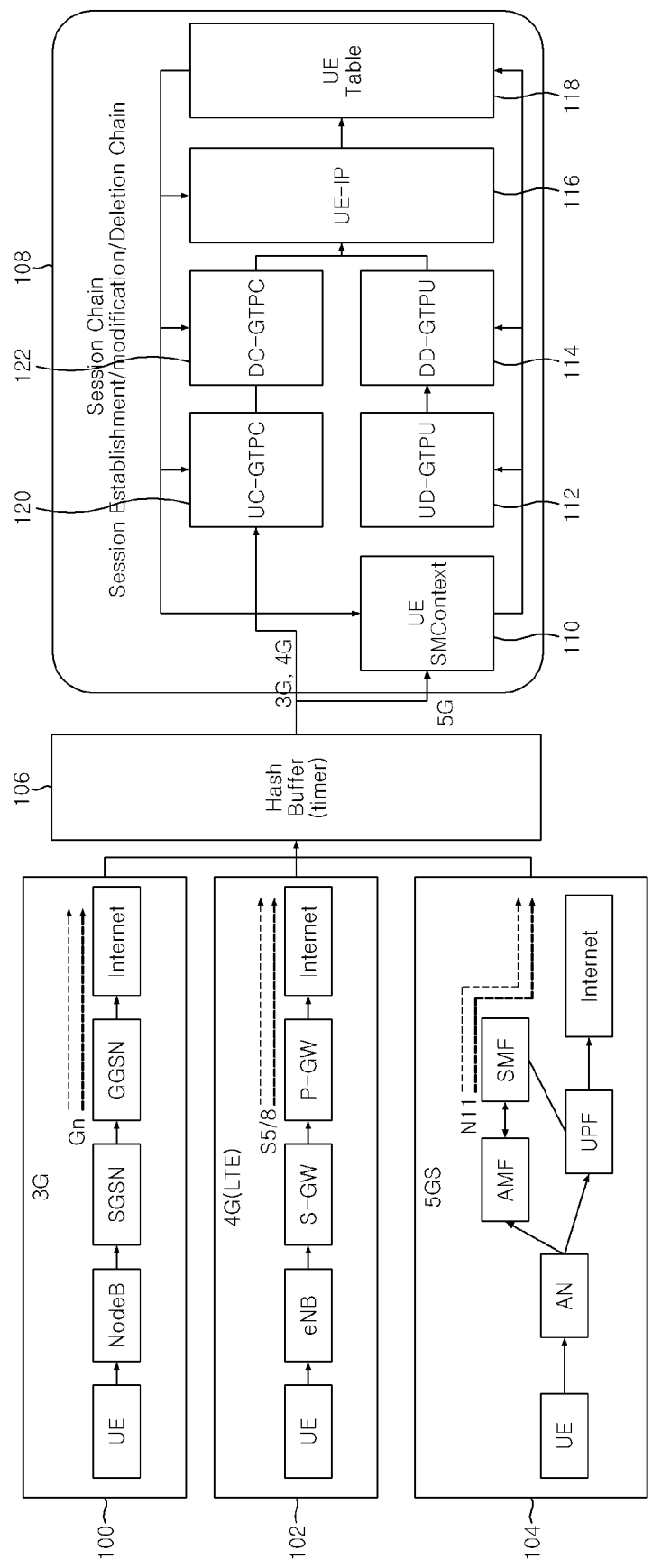
FIG. 1 illustrates terminal session management in a multi-mobile core network.

Hereinafter, embodiments disclosed herein will be described in detail with reference to the accompanying drawings, in which like or similar elements are denoted by like reference numerals regardless of drawing numerals and redundant descriptions thereof will be omitted. As used herein, the terms "module" and "unit" for components are given or interchangeably used only for ease in writing the specification and do not themselves have distinct meanings or functions. That is, the term "unit" used herein refers to software or a hardware component, such as FPGA or ASIC, and a "unit" performs certain functions. However, a "unit" is not limited to software or hardware. A "unit" may be configured to be in an addressable storage medium or may be configured to play one or more processors. Thus, in one example, a "unit" includes components, such as software components, object-oriented software components, class components, and task components, processes, functions, properties, procedures, subroutines, segments of a program code, drivers, firmware, a microcode, circuitry, data, a database, data structures, tables, arrays, and variables. Functions provided in components and "units" may be combined into a smaller number of components and "units" or may be further divided into additional components and "units".

When detailed descriptions about related known technology are determined to make the gist of embodiments disclosed herein unclear in describing the embodiments disclosed herein, the detailed descriptions will be omitted herein. In addition, it should be understood that the accompanying drawings are only for easy understanding of the embodiments disclosed herein, and technical ideas disclosed herein are not limited by the accompanying drawings but include all modifications, equivalents, or substitutes included in the spirit and technical scope of the present disclosure.

Hereinafter, a packet collection method and a packet collection apparatus for virtualization core network session management according to an embodiment of the present disclosure will be described with reference to the accompanying drawings.

FIG. 1 illustrates terminal session management in a multi-mobile core network including a 3G mobile core network 100, a 4G mobile core network 102, and a 5G mobile core network 104.

A session management unit 108 manages user equipment (UE)-related information from a control signal of the mobile core network 100, 102, or 104 by chaining the same. A chain varies depending on the type of a core network to be monitored.

In 5G, the UE-related information may include information extracted from a packet, such as a unique SUPI value, a UE context ID, SM context reference information, an IP allocated from an SMF or a UPF, and a TEID allocated when establishing a GTP tunnel.

In 3G and 4G, the UE-related information may include information extracted from a packet, such as a unique IMSI value of a UE, an MSISDN value, TEID information about a GTP-C, IP information about an SGSN and a GGSN or a S-GW and a P-GW, an IP allocated from a GGSN or a P-GW, and a TEID allocated when establishing a GTP tunnel.

In a 3G core network system, a control signal in a Gn section for managing a session of a terminal may include a session control command, such as PDP context Create/Update/Delete, and may use a GTPv1-C protocol.

In a 4G core network system, a control signal in an S5/8 section for managing a session of a terminal may include a session control command, such as Session Create/Modify/Delete, and may use a GTPv2-C protocol.

In a 5G core network system, a control signal in an N11 section for managing a PDU session of a terminal includes a session control command, such as Session Establishment/Modification/Deletion, and uses a service-based interface (SBI). Nsmf and Namf Request/Response packets may be used by the session management unit 108 to process the control command and manage the session.

Reference number 106 refers to a hash buffer for storing an input packet.

The session management unit 108 may be used in common for the 3G mobile core network 100, the 4G mobile core network 102, and the 5G mobile core network 104 to collect, store, and manage session information in the 3G mobile core network 100, the 4G mobile core network 102, and the 5G mobile core network 104.

The session management unit 108 may include an uplink control-GTPC chain 120 that stores uplink control-related data by each session, based on an input 3G or 4G session-related packet, a downlink control-GTPC chain 122 that stores downlink control-related data by each session, a UE IP chain 116 that stores a UE IP by each session, a UE table chain 118 that stores UE-related data by each session, an uplink data-GTPU chain 112 that stores uplink data by each session, a downlink data-GTPU chain 114 that stores downlink data by each session, and a UE session management context chain 110 that stores a UE session management context by each session, based on an input 5G session-related packet.

In the multi-mobile core network, request/response packets in the 3G Gn, 4G S5/8, and 5G N11 sections may generate a session chain or control the session chain through the hash buffer 106. The session management unit 108 may manage a terminal session regardless of whether a target mobile core network is 3G, 4G, or 5G.

Figure 2:
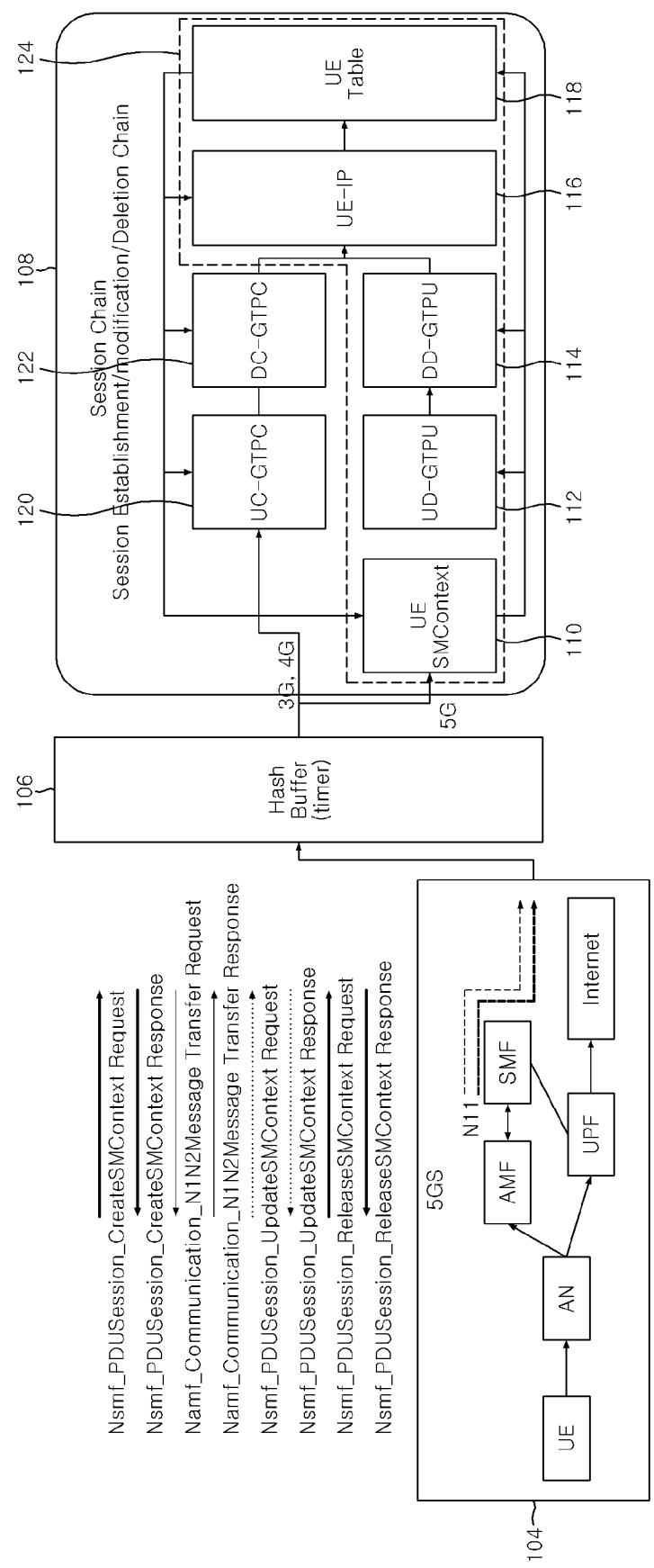
FIG. 2 illustrates terminal session management in a 5G N11 section.

In a 5GC environment, a control message may be transmitted as shown in FIG. 2. The session management unit 108 manages the control message transmitted in this environment. For example, when a UE is established with Nsmf_PDUSession_CreateSMContext, a session chain is created through unique information about the UE.

An uplink-related session chain is generated through a PDU Session Resource Setup Request in NIN2MessageTransfer of Namf, and a downlink-related session chain is generated through Nsmf_PDUSession_UpdateSMContext.

Finally, a PDU session chain is deleted through Nsmf_PDUSession_ReleaseSMContext.

Information about the UE required for modification and deletion is generated as a chain with UE identification information (subscription permanent identifier: SUPI) and session management (SM) context reference at a time of establishment, and thus a session for the UE may be managed.

Figure 3:
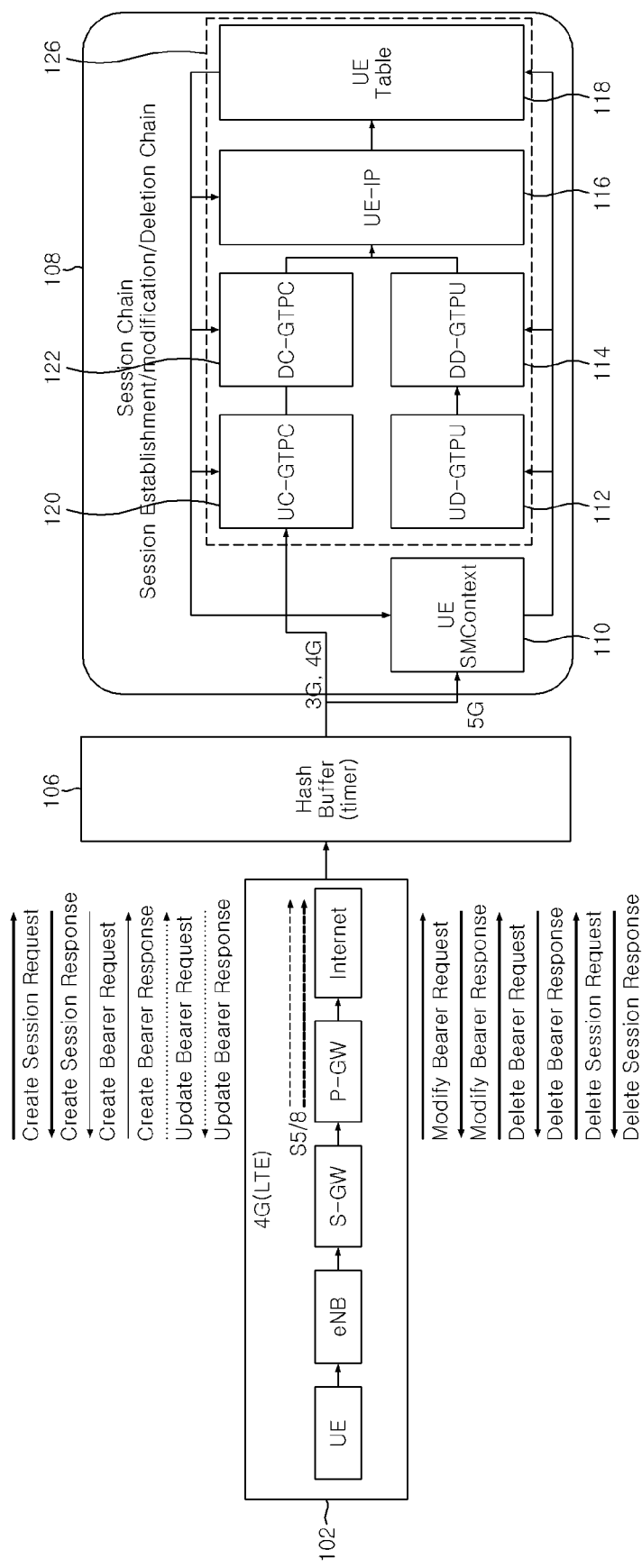
FIG. 3 illustrates terminal session management in a 4G S5/8 section.

In a 4G core network environment, a control message may be transmitted as shown in FIG. 3. The session management unit 108 manages the control message transmitted in this environment.

In initial registration, UE information for registering a session is transmitted to the P-GW via a Create Session Request from a UE. When receiving a Create Session Request message, the session management unit 108 stores the information in the hash buffer 106. The hash buffer 106 has a timer function to perform an operation with respect to a request to which a response arrives within a certain time.

When receiving a Create Session Response message from the P-GW, the session management unit 108 generates a session chain, based on information of exchanged packets. Through the chain, uplink/downlink information is connected to an IP allocated to the UE, IP information is connected to the UE information, and the UE information is connected to the uplink/downlink information and the IP information. A connection direction is unidirectional.

When a Modify Bearer Request for updating the session is received, the request is stored in the hash buffer 106. When a Modify Bearer Response is received, the IP is retrieved with TEID information of a GTP-C header for the operation of the hash buffer 106, and the UE is retrieved with the retrieved IP.

Since a Modify is a GTP-Control (GTP-C) command, the UE IP is retrieved through the TEID information in UC-GTPC or DC-GTPC information. The matched UE updates session information in the connected chain according to the control command.

When a Delete Session Request is received to terminate the session, the request is stored in the hash buffer 106. When a Delete Session Response is received, the IP is retrieved with TEID information of a GTP header for the operation of the hash buffer 106, and the UE is retrieved with the retrieved IP. Since a Delete is also a GTP-Control (GTP-C) command, the UE IP is retrieved through the TEID information in the UC-GTPC or DC-GTPC information depending on the direction of the request. The matched UE deletes the session chain according to the control command.

Figure 4:
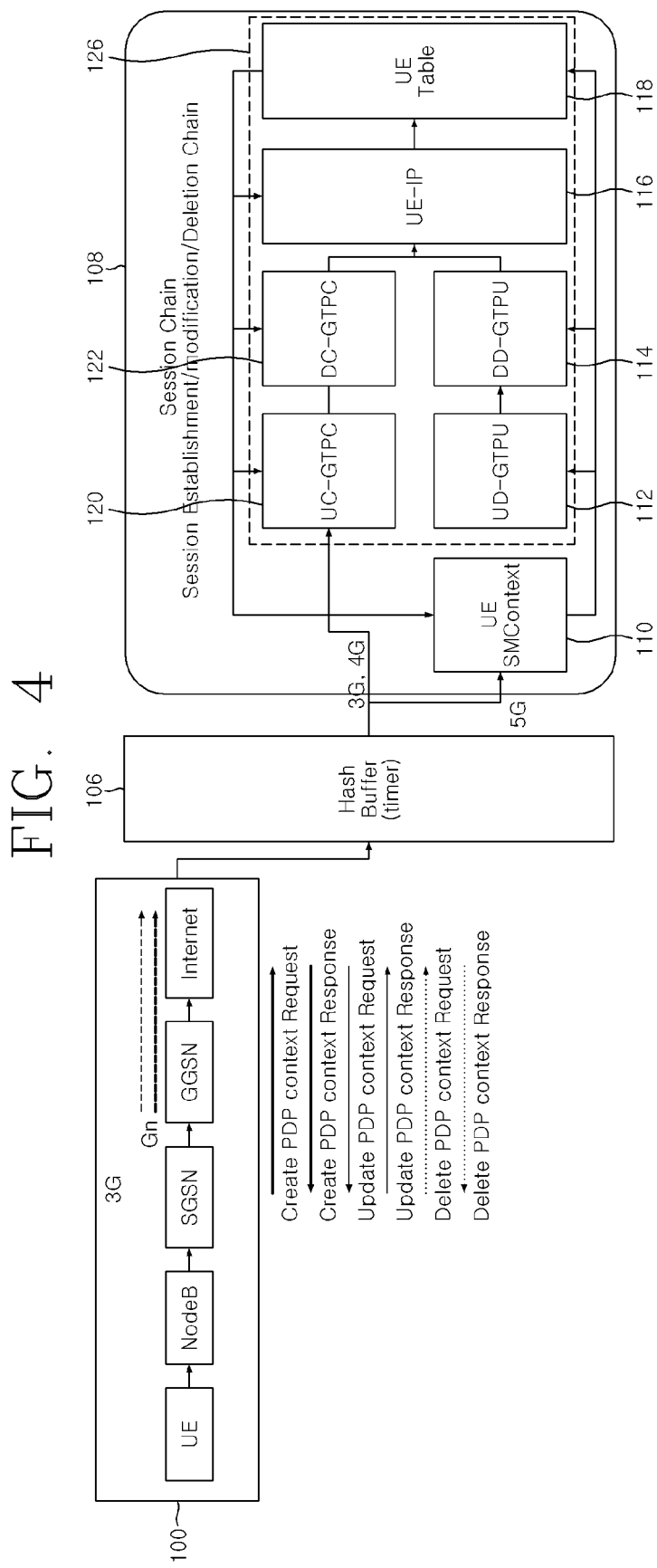
FIG. 4 illustrates terminal session management in a 3G Gn section.

In a 3G core network environment, a control message may be transmitted as shown in FIG. 4. The session management unit 108 manages the control message transmitted in this environment.

In initial registration, UE information for registering a session is transmitted to the GGSN via a Create PDP context Request from a UE. When receiving a Create PDP context Request message, the session management unit 108 stores the information in the hash buffer 106. The hash buffer 106 has a timer function to perform an operation with respect to a request to which a response arrives within a certain time.

When receiving a Create PDP context Response message from the SGSN, the session management unit 108 generates a session chain, based on information of exchanged packets. Through the chain, uplink/downlink information is connected to an IP allocated to the UE. IP information is connected to the UE information, and the UE information is connected to the uplink/downlink information and the IP information. A connection direction is unidirectional.

When an Update PDP context request for updating the session is received, the request is stored in the hash buffer 106. When an Update PDP context response is received, the UE IP is searched with the TEID information of the GTP-C header for the operation of the hash buffer 106, and the UE is searched with the searched UE IP.

Since an Update PDP context is a GTP-Control (GTP-C) command, the UE IP is retrieved through the TEID information in UC-GTPC or DC-GTPC information. The matched UE updates session information in the connected chain according to the control command. When a Delete PDP context Request is received to terminate the session, the request is stored in the hash buffer 106.

When a Delete PDP context Response is received, the UE IP is retrieved with TEID information of a GTP header for the operation of the hash buffer 106, and the UE is retrieved with the retrieved UE IP. Since a Delete is also a GTP-Control (GTP-C) command, the UE IP is retrieved through the TEID information in the UC-GTPC or DC-GTPC information depending on the direction of the request. The matched UE deletes the session chain according to the control command.

To analyze traffic in a virtualized mobile core network environment, a separate virtualized security device is required.

Figure 5:
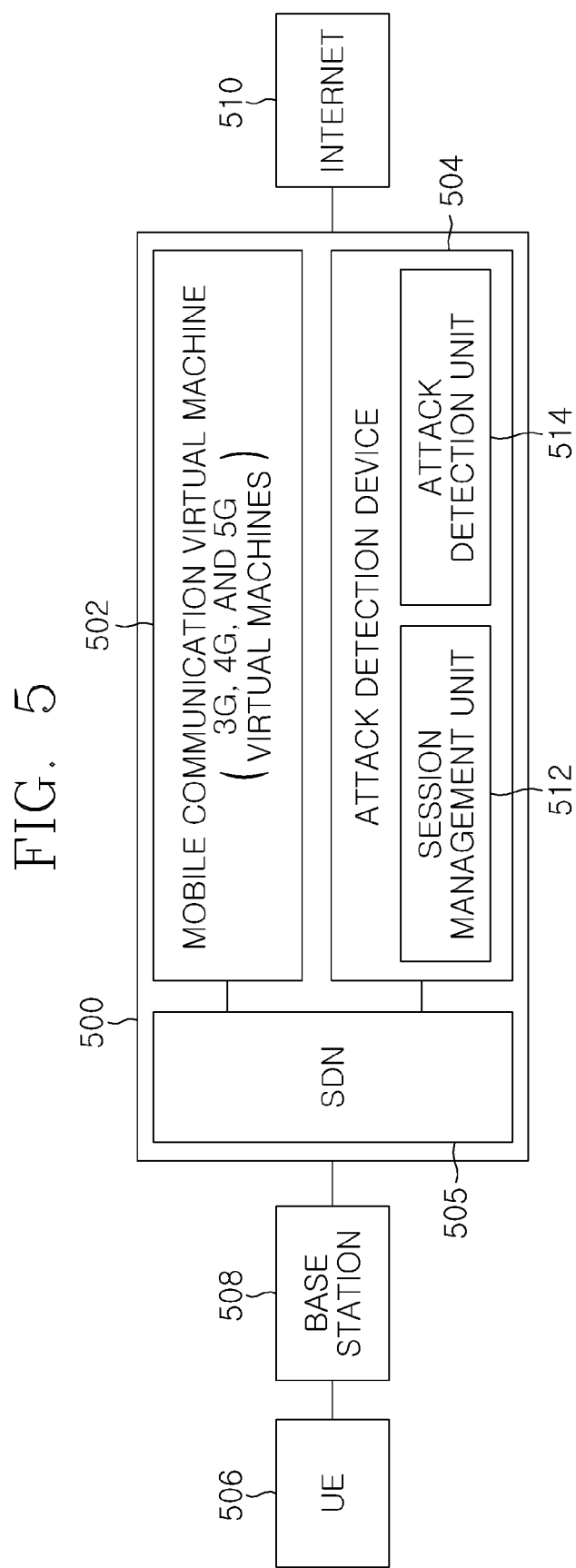
FIG. 5 is a schematic diagram of a packet collection apparatus for virtualization core network session management according to an embodiment of the present disclosure.

FIG. 5 is a schematic diagram of a packet collection apparatus 500 for virtualization core network session management according to an embodiment of the present disclosure.

The packet collection apparatus 500 for virtualization core network session management according to the embodiment of the present disclosure illustrated in FIG. 5 may include a mobile communication virtual machine 502, software-defined networking (SDN) 505, and an attack detection device 504.

The mobile communication virtual machine 502 may include a 3G virtual machine, a 4G virtual machine, and a 5G virtual machine, but the present disclosure is not limited thereto, and the mobile communication virtual machine 502 may include a future mobile communication virtual machine to be further developed, such as a 6G virtual machine.

The packet collection apparatus 500 for virtualization core network session management according to the embodiment of the present disclosure may be configured as hardware including at least one processor capable of performing operations of the packet collection apparatus 500 for virtualization core network session management and a memory, or may be configured as software including computer-executable instructions capable of performing the operations of the packet collection apparatus 500 for virtualization core network session management.

When transmission of a control-related packet occurs in the mobile communication virtual machine 502, the packet collection apparatus 500 for virtualization core network session management may perform an operation of transmitting the control-related packet via a session management unit 512 of the attack detection device 504 through the SDN 505, and the session management unit 512 included in the attack detection device 504 may perform an operation of extracting and collecting session information from the control-related packet received through the SDN 505 and forming a session chain, based on the collected session information. The attack detection unit 514 may perform pattern detection from a payload of the packet received through the SDN 505.

A user equipment (UE) 506 may communicate with a base station 508, the base station 508 may communicate with the packet collection apparatus 500 for virtualization core network session management, and the packet collection apparatus 500 for virtualization core network session management may communicate with an Internet 510.

The attack detection device 504 may include a session management unit 512 and an attack detection unit 514, and may be connected to the SDN 505.

The session management unit 512 included in the attack detection device 504 may perform an operation of extracting and collecting session information from a control-related packet received through the SDN 505 and forming a session chain, based on the collected session information. The attack detection unit 514 may perform pattern detection from a payload of the packet received through the SDN 505.

The packet collection apparatus 500 for virtualization core network session management may include the SDN 505.

The SDN 505 may include an open switch as an open source to control packet flow through an open flow. The SDN 505 may configure a bridge interface connected to a network interface card (NIC), and may configure a virtual interface for the attack detection device 504 and each functional module in a bridge. An IP address of the same network band may be set for each functional module.

The attack detection device 504 may be configured in an inline mode to process all packets without packet modification.

Figure 6:
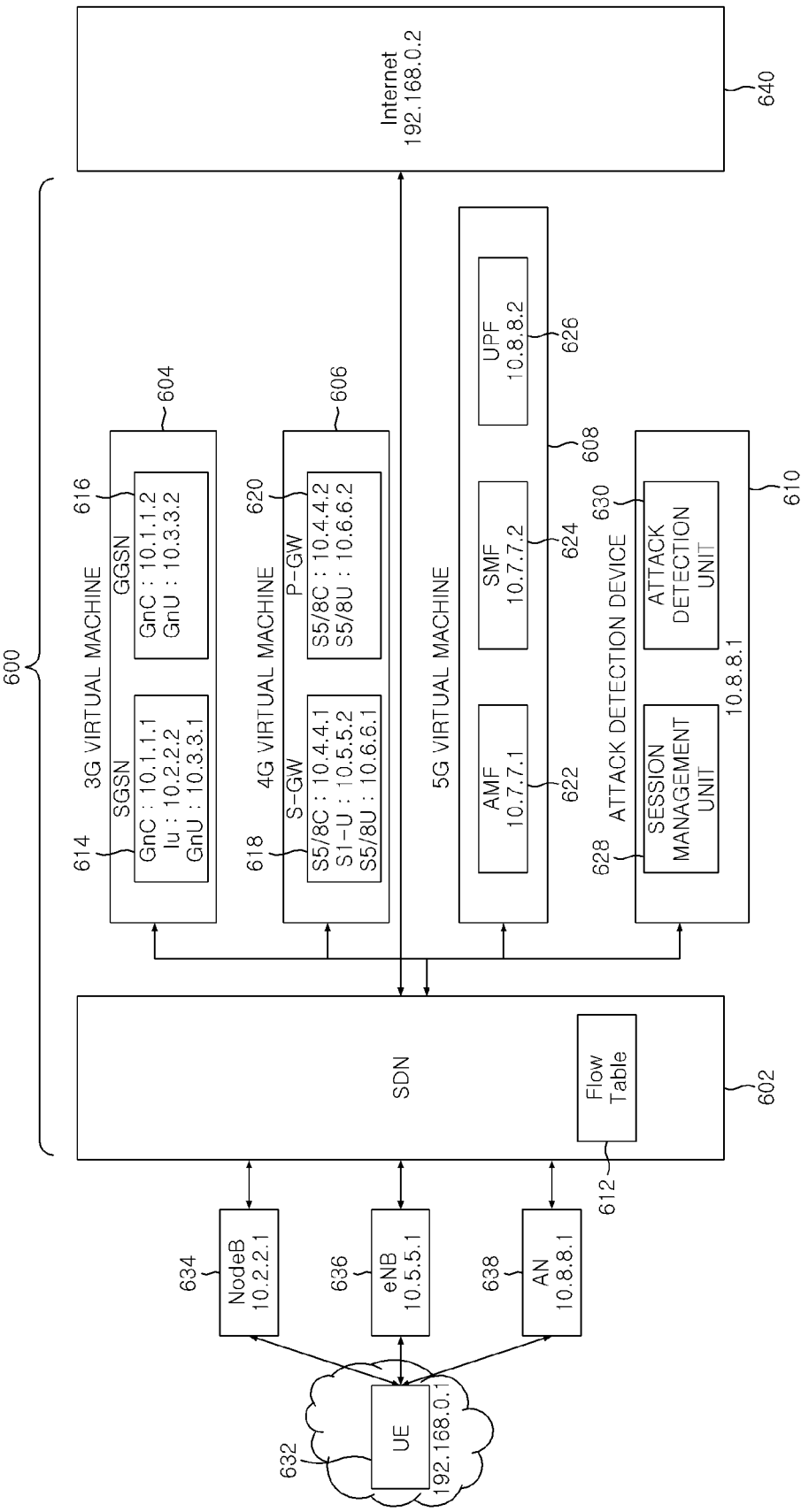
FIG. 6 illustrates a packet collection apparatus for virtualization core network session management according to a first embodiment of the present disclosure.

FIG. 6 illustrates a packet collection apparatus 600 for virtualization core network session management according to a first embodiment of the present disclosure, and FIG. 7 illustrates a flow configuration of a flow table 612 included in SDN 602 in the packet collection apparatus 600 for virtualization core network session management according to the first embodiment of the present disclosure.

The packet collection apparatus 600 for virtualization core network session management according to the first embodiment of the present disclosure illustrated in FIG. 6 may include a 3G virtual machine 604, a 4G virtual machine 606, a 5G virtual machine 608, software definition networking (SDN) 602, and an attack detection device 610. The attack detection device 610 may include a session management unit 628 and an attack detection unit 630.

The session management unit 628 of the attack detection device 610 may include the session management unit 108 illustrated in FIG. 1.

The 3G virtual machine 604 may transmit a control-related packet to be transmitted between a serving GPRS support node (SGSN) 614 and a gateway GPRS support node (GGSN) 616 via the session management unit 628 of the attack detection device 610 through the SDN 602.

The 4G virtual machine 606 may transmit a control-related packet to be transmitted between a serving gateway (S-GW) 618 and a packet data network gateway (P-GW) 620 via the session management unit 628 of the attack detection device 610 through the SDN 602.

The 5G virtual machine 608 may transmit a control-related packet to be transmitted between an access and mobility management function (AMF) 622 and a session management function (SMF) 624 via the session management unit 628 of the attack detection device 610 through the SDN 602.

The session management unit 628 may extract and collect session information from a control-related packet received through the SDN 602, and may form a session chain, based on the collected session information.

Reference numeral 632 denotes a user equipment (UE), reference numerals 634, 636, and 638 denote base stations, reference numeral 612 denotes the flow table, reference numeral 626 denotes a user plane function (UPF), and reference numeral 640 denotes an Internet.

The 3G virtual machine 604 may transmit a user data-related packet to be transmitted between the SGSN 614 and the GGSN 616 via the attack detection unit 630 of the attack detection device 610 through the SDN 602.

The 4G virtual machine 606 may transmit a user data-related packet to be transmitted between the S-GW 618 and the P-GW 620 via the attack detection unit 630 of the attack detection device 610 through the SDN 602.

The 5G virtual machine 608 may transmit a user data-related packet to be transmitted between a base station 638 and the UPF 626 via the attack detection unit 630 of the attack detection device 610 through the SDN 602.

The attack detection unit 630 may perform pattern detection from a payload of a packet received through the SDN 602.

As illustrated in FIG. 6, an IP address of the same network band may be set for each functional module of the packet collection apparatus 600 for virtualization core network session management according to the first embodiment of the present disclosure.

In the flow table 612, a flow between the SGSN 614, the GGSN 616, and the session management unit 628 included in the 3G virtual machine 604, a flow between the SGSN 614, the GGSN 616, and the attack detection unit 630 included in the 3G virtual machine 604, a flow between the S-GW 618, the P-GW 620, and the session management unit 628 included in the 4G virtual machine 606, a flow between the S-GW 618, the P-GW 620, and the attack detection unit 630 included in the 4G virtual machine 606, a flow between the AMF 622, the SMF 624, and the session management unit 628 included in the 5G virtual machine 608, and a flow between a base station (AN) 638, the UPF 626, and the attack detection unit 630 included in the 5G virtual machine 608 may be defined based on an input port of the SDN 602, an output port of the SDN 602, a source of a packet, and a destination of the packet.

An operation of the packet collection apparatus 600 for virtualization core network session management according to the first embodiment of the present disclosure will be described in detail with reference to the accompanying drawings.

FIG. 8 illustrates an operation in packet flow from a UE to an Internet in 3G according to the first embodiment of the present disclosure, which illustrates a GnU section from the SGSN 614 to the GGSN 616.

① When the UE 632 connects to the Internet, a GTP-U packet transmitted from the SGSN 614 to the GGSN 616 is entered through a network interface card (NIC) of a system, and then ② the SDN 602 transmits the packet to an Iu interface 800 of an SGSN 614 according to a flow configuration with a condition that an IP of the SGSN Iu interface 800 is a destination IP.

③ The SGSN 614 transmits the received packet to the SDN 602 through a GnU interface 802, and ④ the SDN 602 transmits the received packet to the attack detection unit 630 according to an in_port flow configuration with a condition that an IP of a GGSN GnU interface 806 is a destination IP.

⑤ The attack detection unit 630 detects a pattern from a payload of the packet received through the SDN 602, and transmits the packet to the SDN 602. The SDN 602 transmits the received packet to the GnU interface 806 of a GGSN 616 according to the in_port flow configuration with the condition that the IP of the GGSN GnU interface 806 is the destination IP. ⑥ The GGSN 616 transmits the received packet to the SDN 602 through a Gi interface 808, and ⑦ the SDN 602 transmits the received packet to the Internet 640 through the NIC (not shown).

Figure 9:
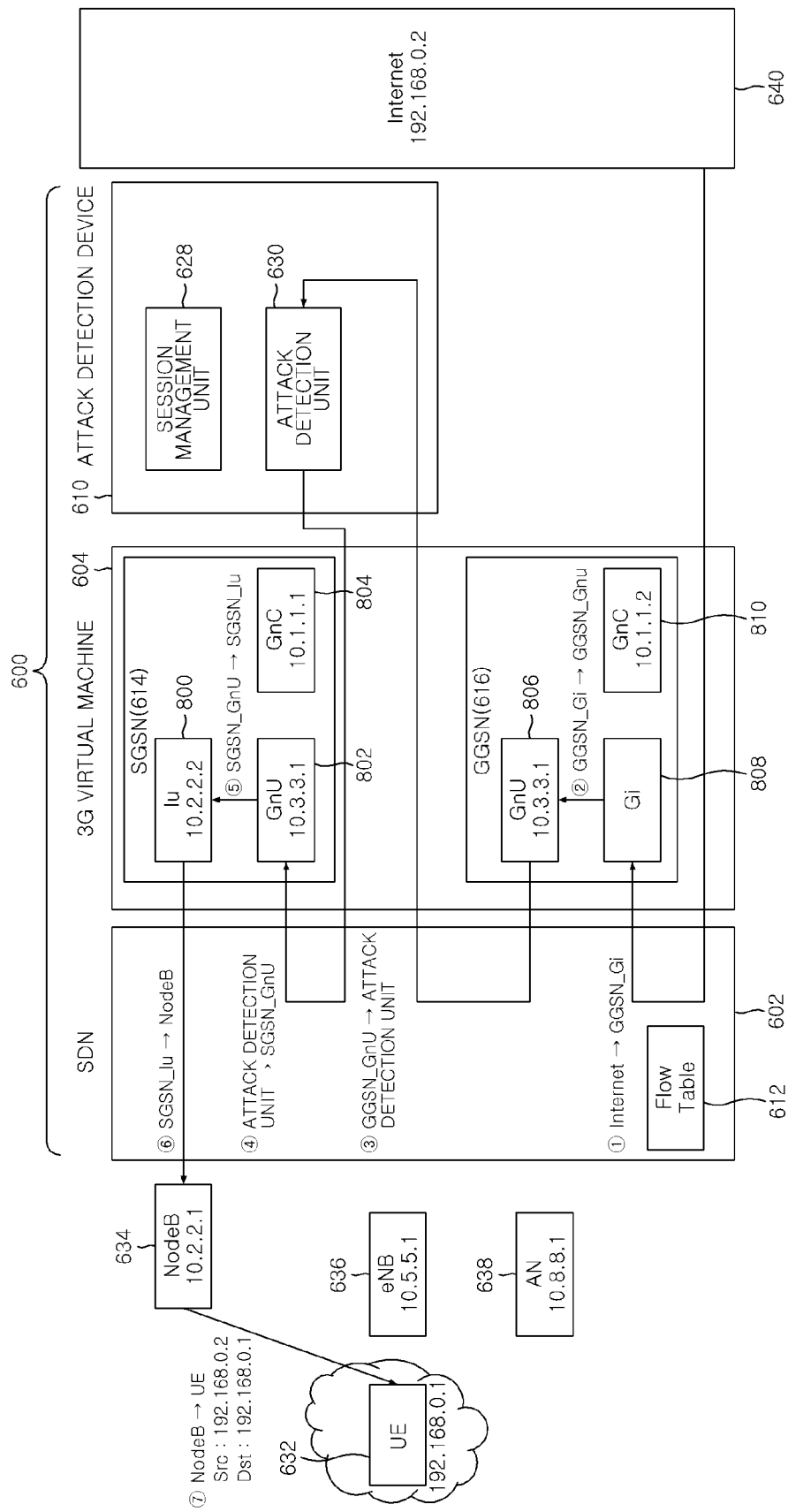
FIG. 9 illustrates an operation in packet flow from an Internet to a UE in 3G according to the first embodiment of the present disclosure.

FIG. 9 illustrates an operation in packet flow from an Internet to a UE in 3G according to the first embodiment of the present disclosure, which illustrates a GnU section from the GGSN 616 to the SGSN 614.

① When the UE 632 connects to the Internet, as a response packet, a GTP-U packet transmitted from the GGSN 616 to the SGSN 614 is entered through the network interface card (NIC) of the system, and then the SDN 602 transmits the packet to the Gi interface 808 of the GGSN 616 according to an in_port flow configuration with a condition that an IP of the GGSN Gi interface 808 is a destination IP.

② The GGSN 616 transmits the received packet to the SDN 602 through the GnU interface 806, and ③ the SDN 602 transmits the received packet to the attack detection unit 630 according to an in_port flow configuration with a condition that an IP of the SGSN GnU interface 802 IP is a destination IP.

④ The attack detection unit 630 detects a pattern from a payload of the packet received through the SDN 602, and transmits the packet to the SDN 602. The SDN 602 transmits the received packet to the GnU interface 802 of the SGSN 614 according to the in_port flow configuration with the condition that the IP of the SGSN GnU interface 802 is the destination IP.

⑤ The SGSN 614 transmits the received packet to the SDN 602 through the Iu interface 800, and ⑥ the SDN 602 transmits the received packet to a NodeB 634 through the NIC. ⑦ The NodeB 634 transmits the received packet to the UE 632.

Figure 10:
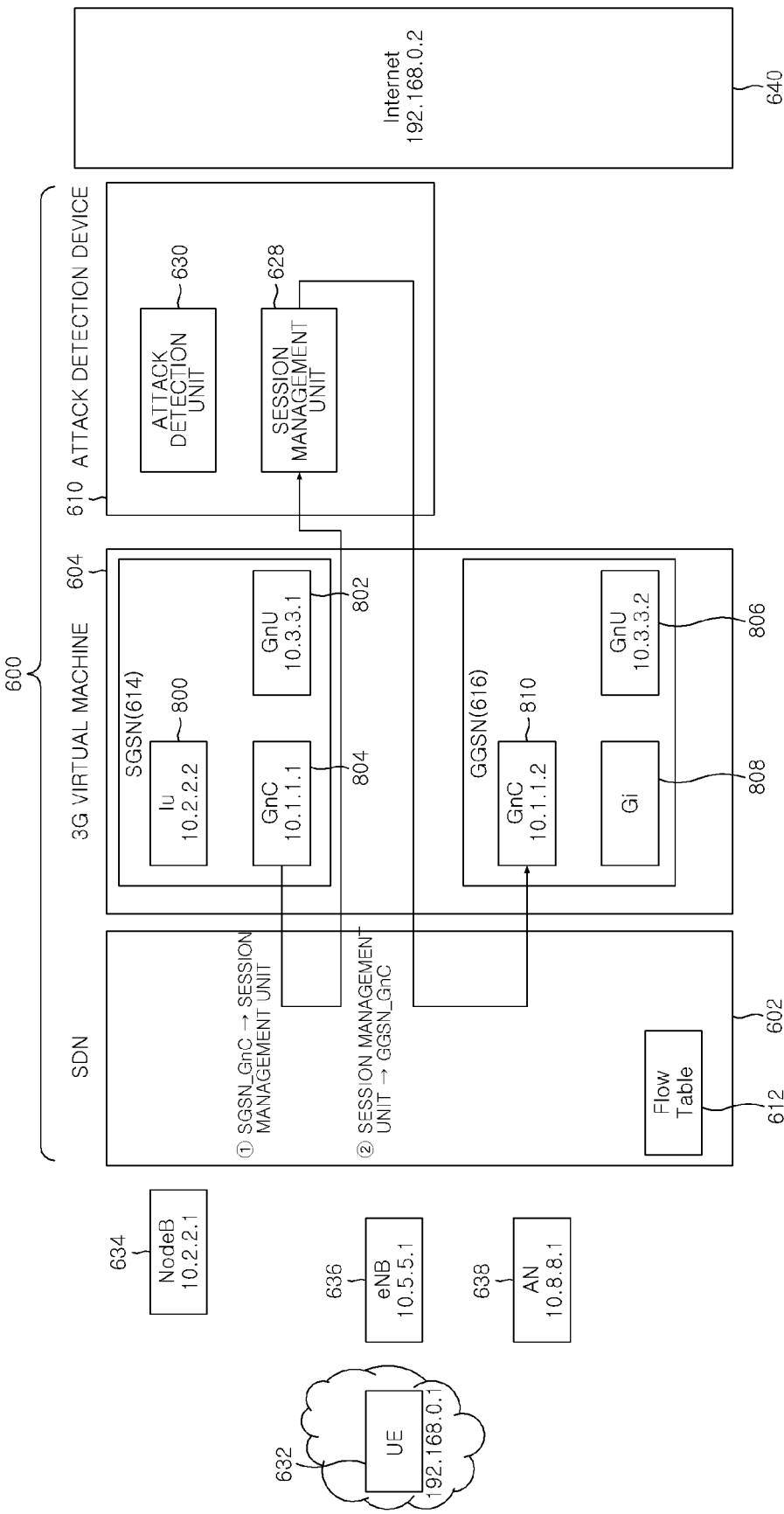
FIG. 10 illustrates an operation in packet flow from an SGSN to a GGSN in 3G according to the first embodiment of the present disclosure.

FIG. 10 illustrates an operation in packet flow from an SGSN to a GGSN in 3G according to the first embodiment of the present disclosure, which illustrates a GnC section from the SGSN 614 to the GGSN 616.

① When the SGSN 614 requests session information from the GGSN 616 or when the SGSN 614 returns session information in response to a session information request from the GGSN 616, a corresponding packet is transmitted to the SDN 602 through a GnC interface 804 of the SGSN 614, and the SDN 602 transmits the received packet to the session management unit 628 according to an in_port flow configuration with a condition that an IP of a GGSN GnC interface 810 is a destination IP.

② The session management unit 628 collects session information from the packet received through the SDN 602, and transmits the packet to the SDN 602. The SDN 602 transmits the received packet to the GnC interface 810 of the GGSN 616 according to the in_port flow configuration with the condition that the IP of the GGSN GnC interface 810 is the destination IP.

Figure 11:
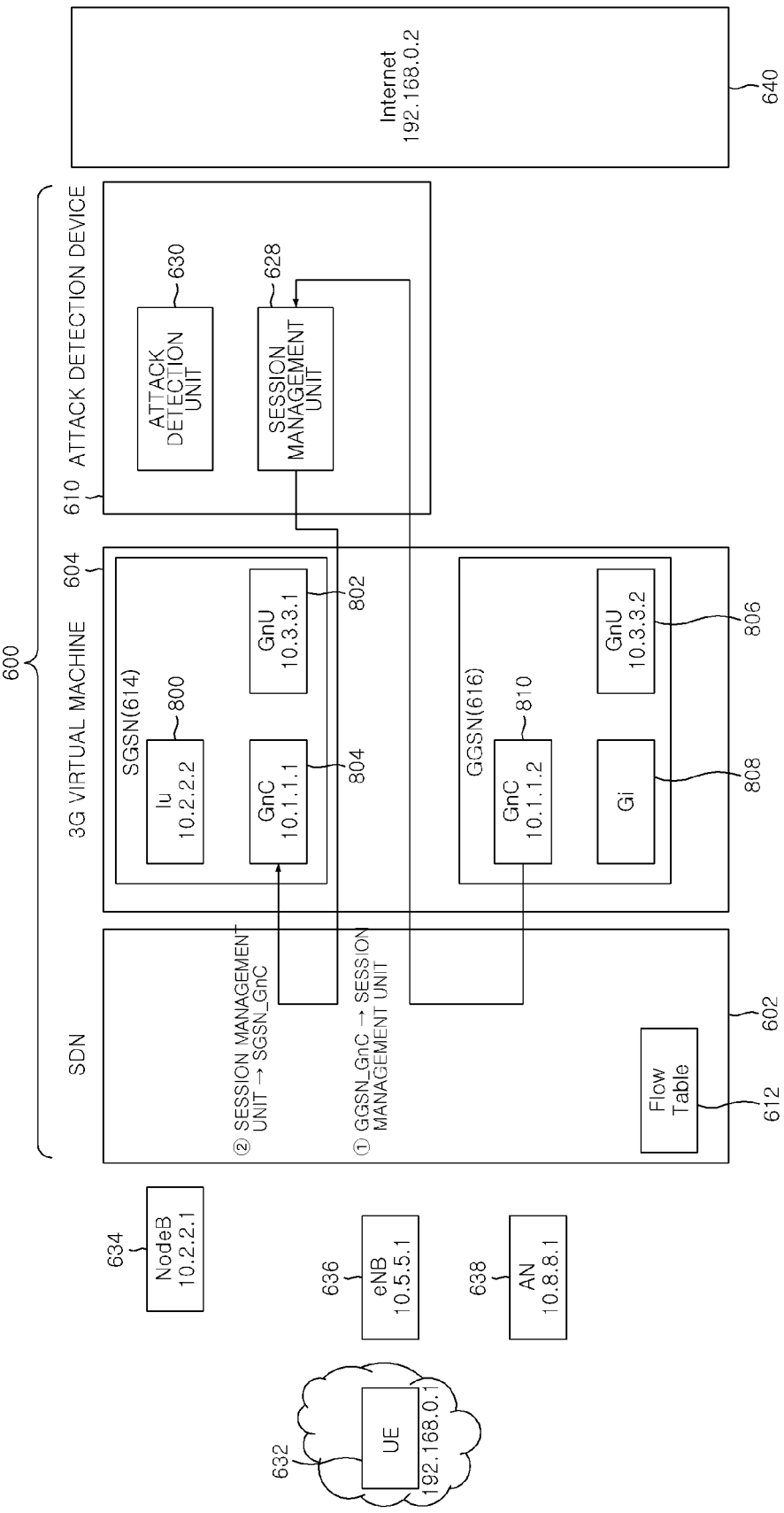
FIG. 11 illustrates an operation in packet flow from a GGSN to an SGSN in 3G according to the first embodiment of the present disclosure.

FIG. 11 illustrates an operation in packet flow from a GGSN to an SGSN in 3G according to the first embodiment of the present disclosure, which illustrates a GnC section from the GGSN 616 to the SGSN 614.

① When the GGSN 616 requests session information from the SGSN 614 or when the GGSN 616 returns session information in response to a session information request from the SGSN 614, a corresponding packet is transmitted to the SDN 602 through the GnC interface 810 of the GGSN 616, and the SDN 602 transmits the received packet to the session management unit 628 according to an in_port flow configuration with a condition that an IP of the SGSN GnC interface 804 is a destination IP.

② The session management unit 628 collects session information from the packet received through SDN 602, and transmits the packet to the SDN 602. The SDN 602 transmits the received packet to the packet to the GnC interface 804 of the SGSN 614 according to the in_port flow configuration with the condition that the IP of the SGSN GnC interface 804 is the destination IP.

Figure 12:
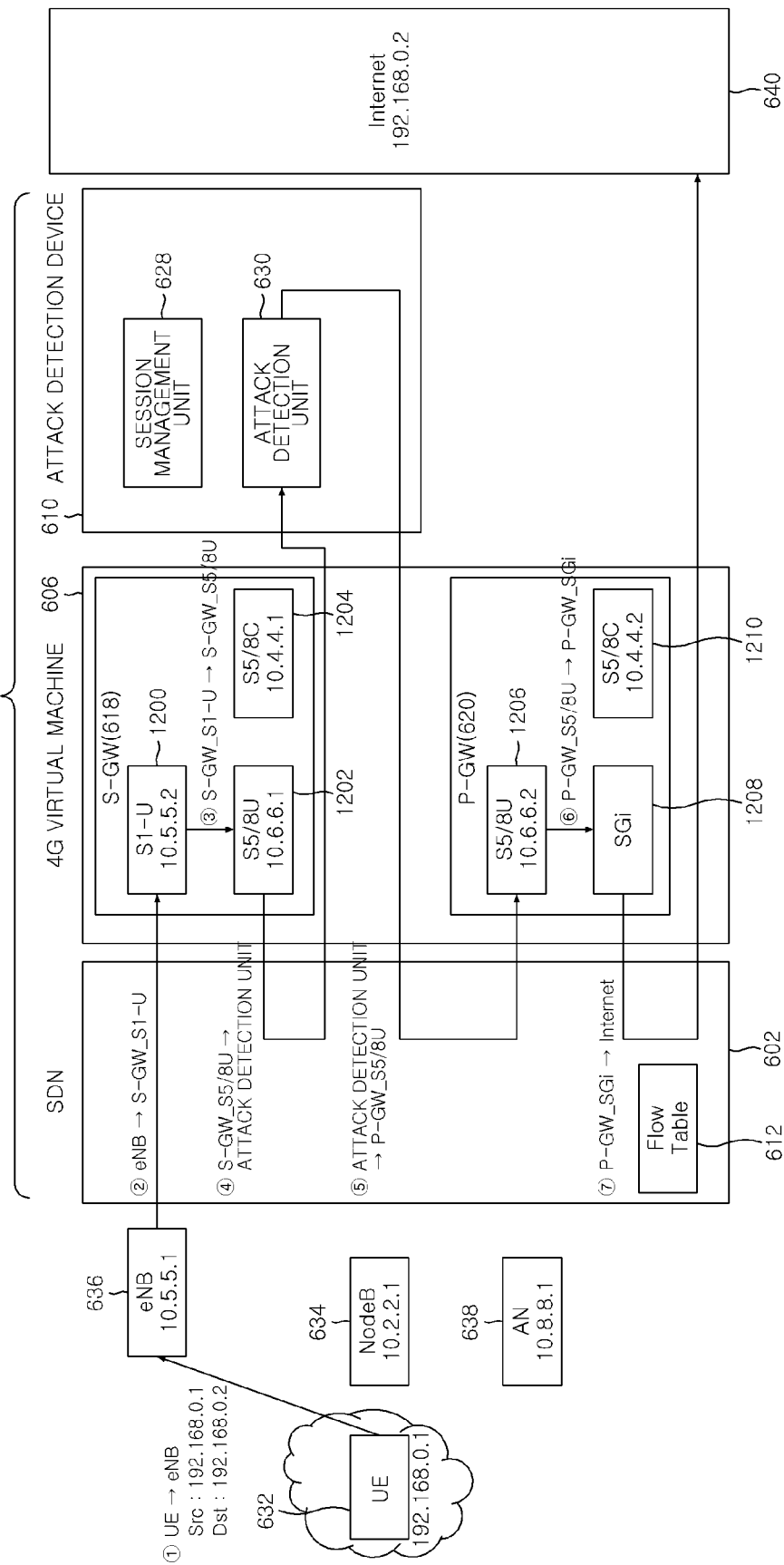
FIG. 12 illustrates an operation in packet flow from a UE to an Internet in 4G according to the first embodiment of the present disclosure.

FIG. 12 illustrates an operation in packet flow from a UE to an Internet in 4G according to the first embodiment of the present disclosure, which illustrates an S5/8U section from the S-GW 618 to the P-GW 620.

① When the UE 632 connects to the Internet, a GTP-U packet transmitted from the S-GW 618 to the P-GW 620 is entered through the NIC of the system, and then ② the SDN 602 transmits the packet to an S1-U interface 1200 of a S-GW 618 according to an in_port flow with a condition that an IP of the S-GW S1-U interface 1200 is a destination IP.

③ The S-GW 618 transmits the received packet to the SDN 602 through an S5/8U interface 1202, and ④ the SDN 602 transmits the received packet to the attack detection unit 630 according to an in_port flow configuration with a condition that an IP of a P-GW S5/8U interface 1206 is a destination IP.

⑤ The attack detection unit 630 detects a pattern from a payload of the packet received through the SDN 602, and transmits the packet to the SDN 602. The SDN 602 transmits the received packet to the S5/8U interface 1206 of a P-GW 620 according to the in_port flow configuration with the condition that the IP of the P-GW S5/8U interface 1206 is the destination IP.

⑥ The P-GW 620 transmits the received packet to the SDN 602 through an SGi interface 1208, and ⑦ the SDN 602 transmits the received packet to the Internet 640 through the NIC.

Figure 13:
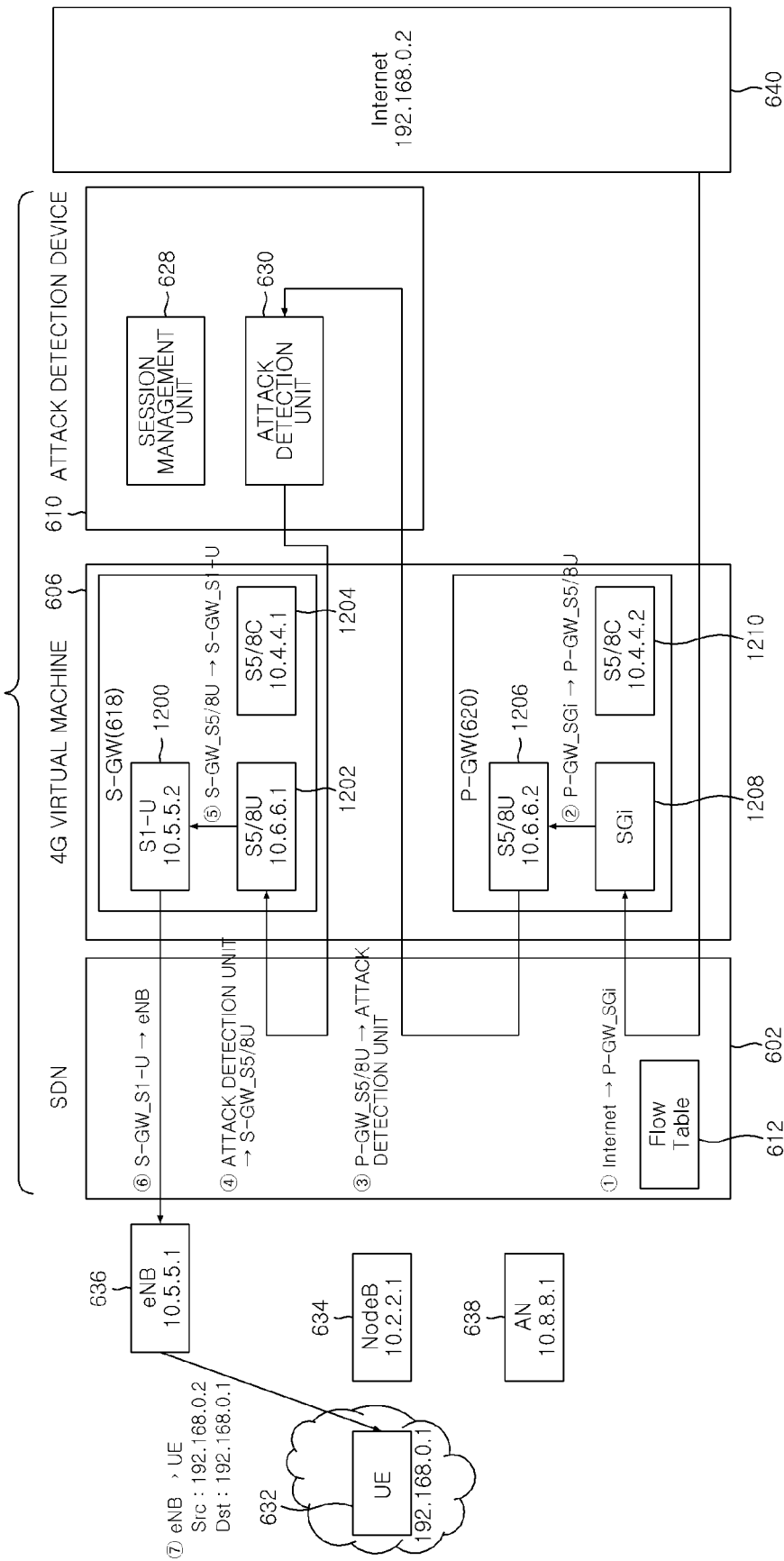
FIG. 13 illustrates an operation in packet flow from an Internet to a UE in 4G according to the first embodiment of the present disclosure.

FIG. 13 illustrates an operation in packet flow from an Internet to a UE in 4G according to the first embodiment of the present disclosure, which illustrates an S5/8U section from the P-GW 620 to the S-GW 618.

① When the UE 632 connects to the Internet, as a response packet, a GTP-U packet transmitted from the P-GW 620 to the S-GW 618 is entered through the NIC of the system, and then ② the SDN 602 transmits the packet to the SGi interface 1208 of the P-GW 620 according to an in_port flow configuration with a condition that an IP of the P-GW SGi interface 1208 is a destination IP.

③ The P-GW 620 transmits the received packet to the SDN 602 through the S5/8U interface 1206, and the SDN 602 transmits the received packet to the attack detection unit 630 according to an in_port flow configuration with a condition that an IP of the S-GW S5/8U interface 1202 is a destination IP.

④ The attack detection unit 630 detects a pattern from a payload of the packet received through the SDN 602, and transmits the packet to the SDN 602. The SDN 602 transmits the received packet to the S5/8U interface 1202 of the S-GW 618 according to the in_port flow configuration with the condition that the IP of the S-GW S5/8U interface 1202 is the destination IP.

⑤ The S-GW 618 transmits the t received packet to the SDN 602 through the S1-U interface 1200, and ⑥ the SDN 602 transmits the received packet to an eNB 636 through the NIC. ⑦ The eNB 636 transmits the received packet to the UE 632.

Figure 14:
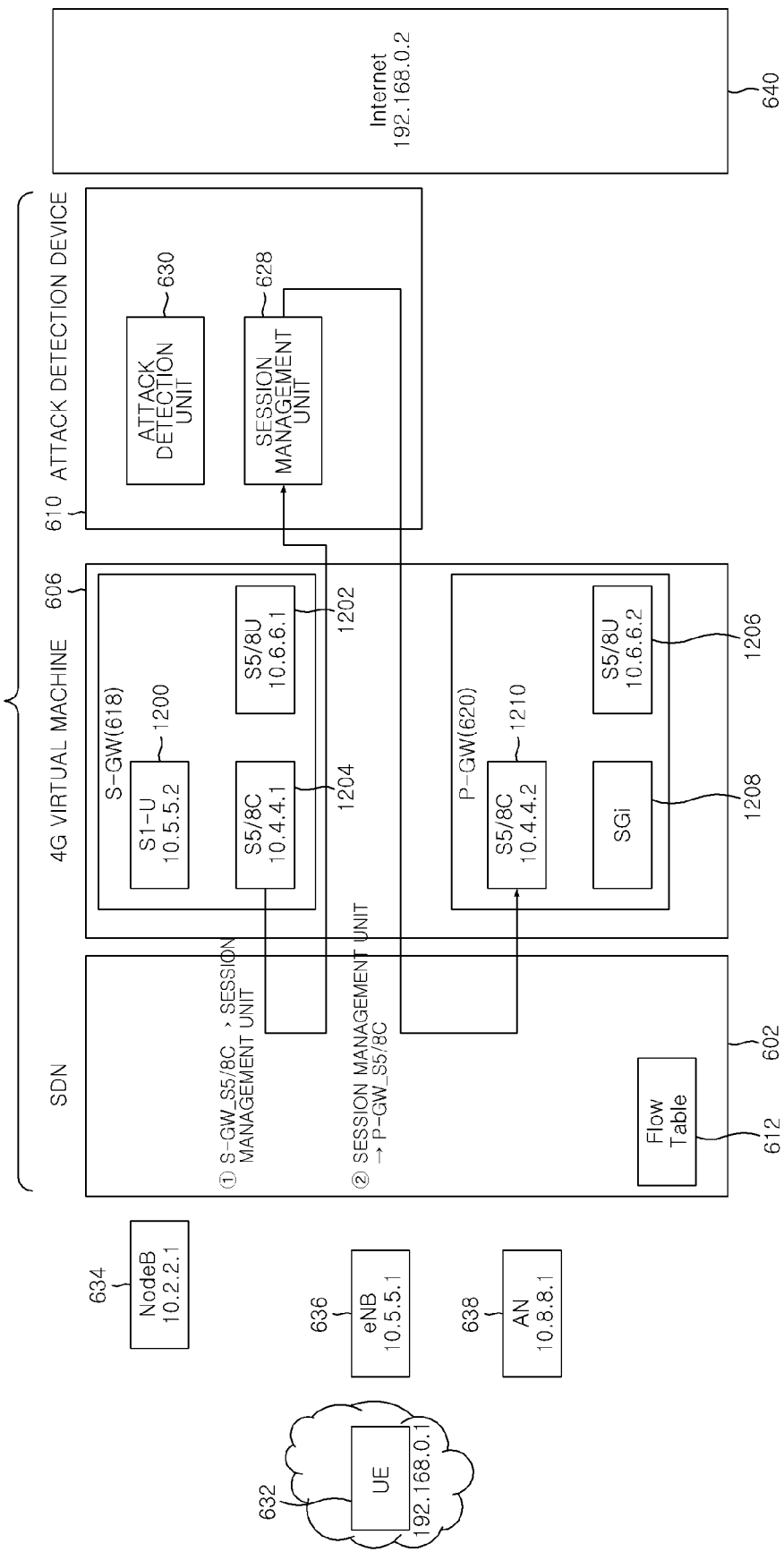
FIG. 14 illustrates an operation in packet flow from an S-GW to a P-GW in 4G according to the first embodiment of the present disclosure.

FIG. 14 illustrates an operation in packet flow from an S-GW to a P-GW in 4G according to the first embodiment of the present disclosure, which illustrates a S5/8C section from the S-GW 618 to the P-GW 620.

① When the S-GW 618 requests session information from the P-GW 620 or when the S-GW 618 returns session information in response to a session information request from the P-GW 620, a corresponding packet is transmitted to the SDN 602 through an S5/8C interface 1204 of the S-GW 618, and the SDN 602 transmits the received packet to the session management unit 628 according to an in_port flow configuration with a condition that an IP of a P-GW S5/8C interface 1210 is a destination IP.

② The session management unit 628 collects session information from the packet received through the SDN 602, and transmits the packet to the SDN 602. The SDN 602 transmits the received packet to the S5/8C interface 1210 of the P-GW 620 according to the in_port flow configuration with the condition that the IP of the P-GW S5/8C interface 1210 is the destination IP.

Figure 15:
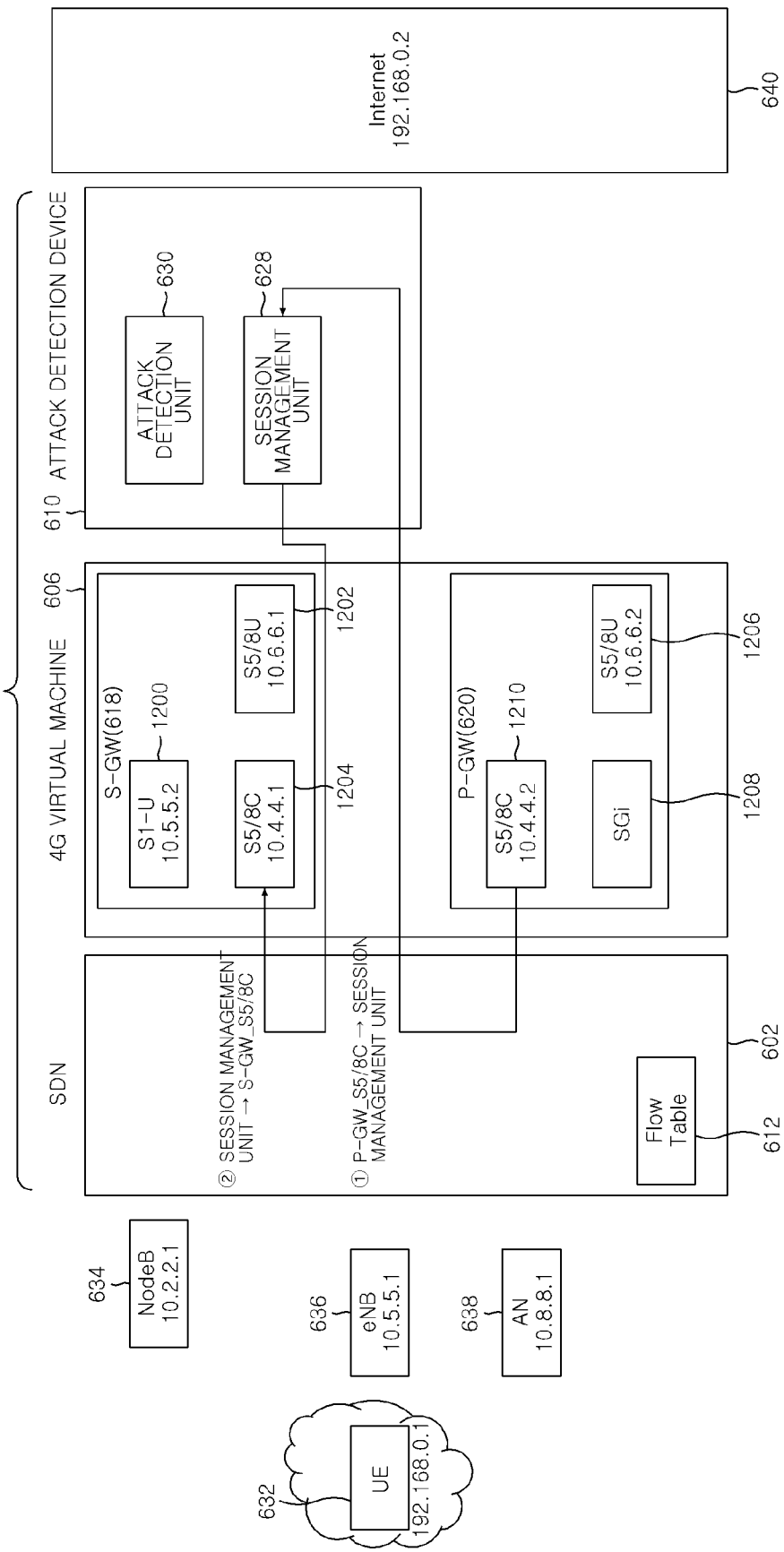
FIG. 15 illustrates an operation in packet flow from a P-GW to an S-GW in 4G according to the first embodiment of the present disclosure.

FIG. 15 illustrates an operation in packet flow from a P-GW to an S-GW in 4G according to the first embodiment of the present disclosure, which illustrates an S5/8C section from the P-GW 620 to the S-GW 618.

① When the P-GW 620 requests session information from the S-GW 618 or when the P-GW 620 returns session information in response to a session information request from the S-GW 618, a corresponding packet is transmitted to the SDN 602 through the S5/8C interface 1210 of the P-GW 620, and the SDN 602 transmits the received packet to the session management unit 628 according to an in_port flow configuration with a condition that an IP of the S-GW S5/8C interface 1204 is a destination IP.

② The session management unit 628 collects session information from the packet received through the SDN 602, and transmits the packet to the SDN 602. The SDN 602 transmits the received packet to the S5/8C interface 1204 of the S-GW 618 according to the in_port flow configuration with the condition that the IP of the S-GW S5/8C interface 1204 is the destination IP.

Figure 16:
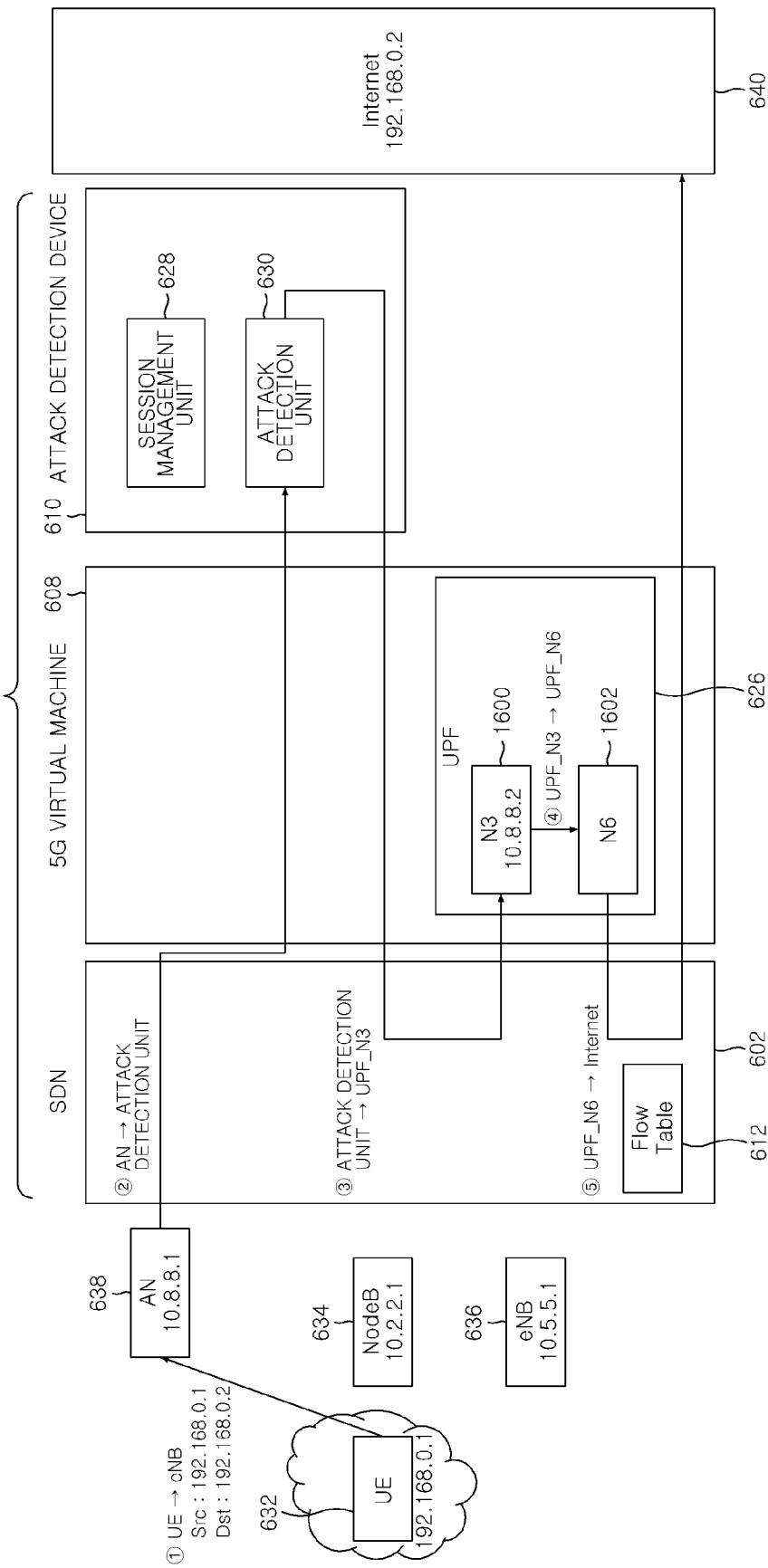
FIG. 16 illustrates an operation in packet flow from a UE to an Internet in 5G according to the first embodiment of the present disclosure.

FIG. 16 illustrates an operation in packet flow from a UE to an Internet in 5G according to the first embodiment of the present disclosure, which illustrates an N3 section from the AN 638 to the UPF 626.

① When the UE 632 connects to the Internet, a GTP-U packet transmitted from the AN 638 to the UPF 626 is entered through the NIC of the system, and then ② the SDN 602 transmits the packet to the attack detection unit 630 according to an in_port flow with a condition that an IP of a UPF N3 interface 1600 is a destination IP.

③ The attack detection unit 630 detects a pattern from a payload of the packet received through the SDN 602, and transmits the packet to the SDN 602. The SDN 602 transmits the received packet to the N3 interface 1600 of a UPF 626 according to the flow configuration with the condition that the IP of the UPF N3 interface 1600 is the destination IP.

④ The UPF 626 transmits the received packet to the SDN 602 through an N6 interface 1602, and ⑤ the SDN 602 transmits the received packet to the Internet 640 through the NIC.

Figure 17:
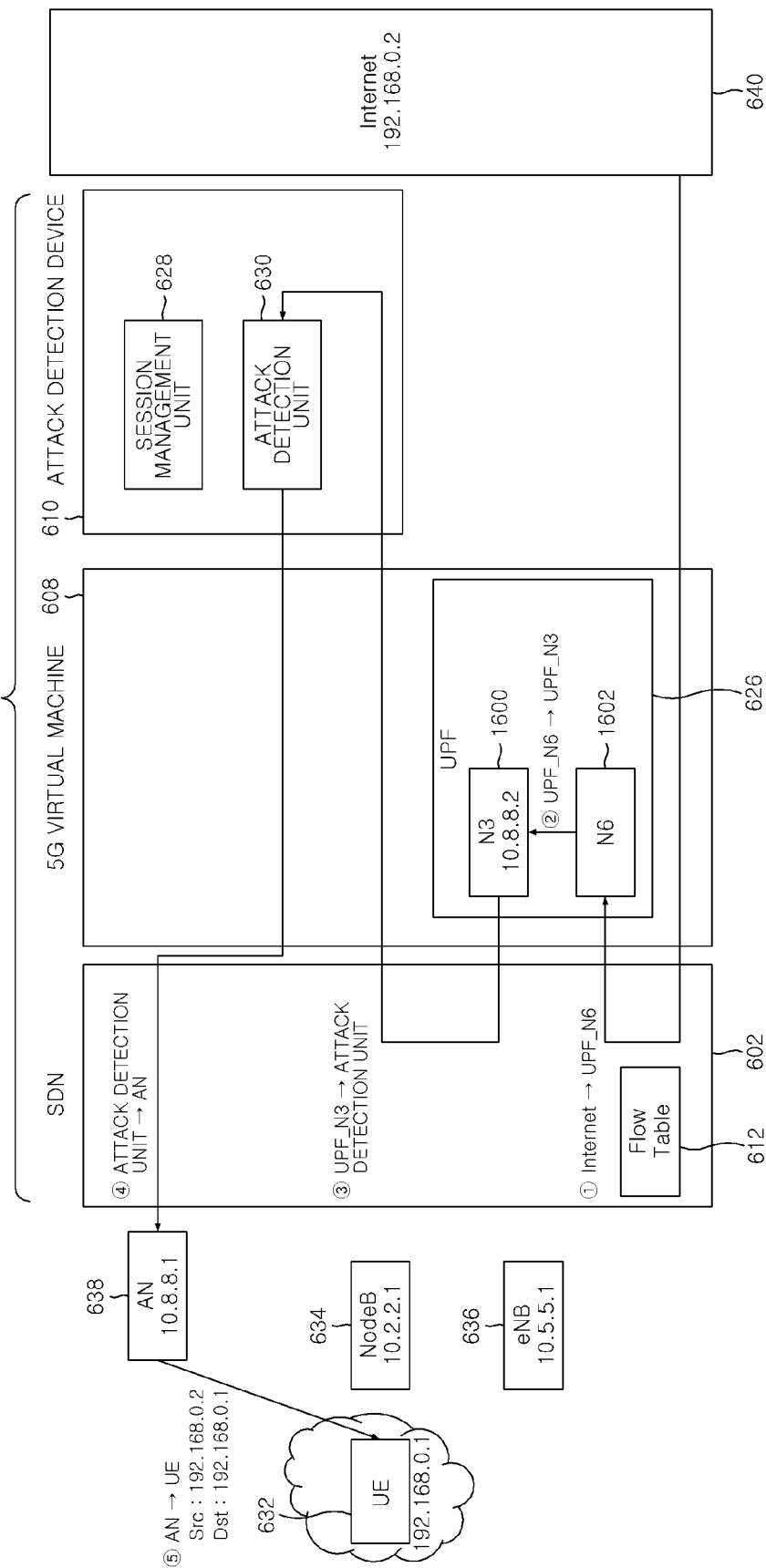
FIG. 17 illustrates an operation in packet flow from an Internet to a UE in 5G according to the first embodiment of the present disclosure.

FIG. 17 illustrates an operation in packet flow from an Internet to a UE in 5G according to the first embodiment of the present disclosure, which illustrates an N3 section from the UPF 626 to the AN 638.

① When the UE 632 connects to the Internet, as a response packet, a GTP-U packet transmitted from the UPF 626 to the AN 638 is entered through the NIC of the system, and then the SDN 602 transmits the packet to the N6 interface 1602 of the UPF 626 according to a flow configuration with a condition that an IP of the UPF N6 interface 1602 is a destination IP.

② The UPF 626 transmits the received packet to the SDN 602 through the N3 interface 1600, and ③ the SDN 602 transmits the received packet to the attack detection unit 630 according to an in_port flow configuration with a condition that an IP of an AN N3 interface 638 is a destination IP.

④ The attack detection unit 630 detects a pattern from a payload of the packet received through the SDN 602, and transmits the packet to the SDN 602. The SDN 602 transmits the received packet to the N3 interface 638 of an AN 638 according to the in_port flow configuration with the condition that the IP of the AN N3 interface 638 is the destination IP.

⑤ The AN 638 transmits the received packet to the UE 632.

Figure 18:
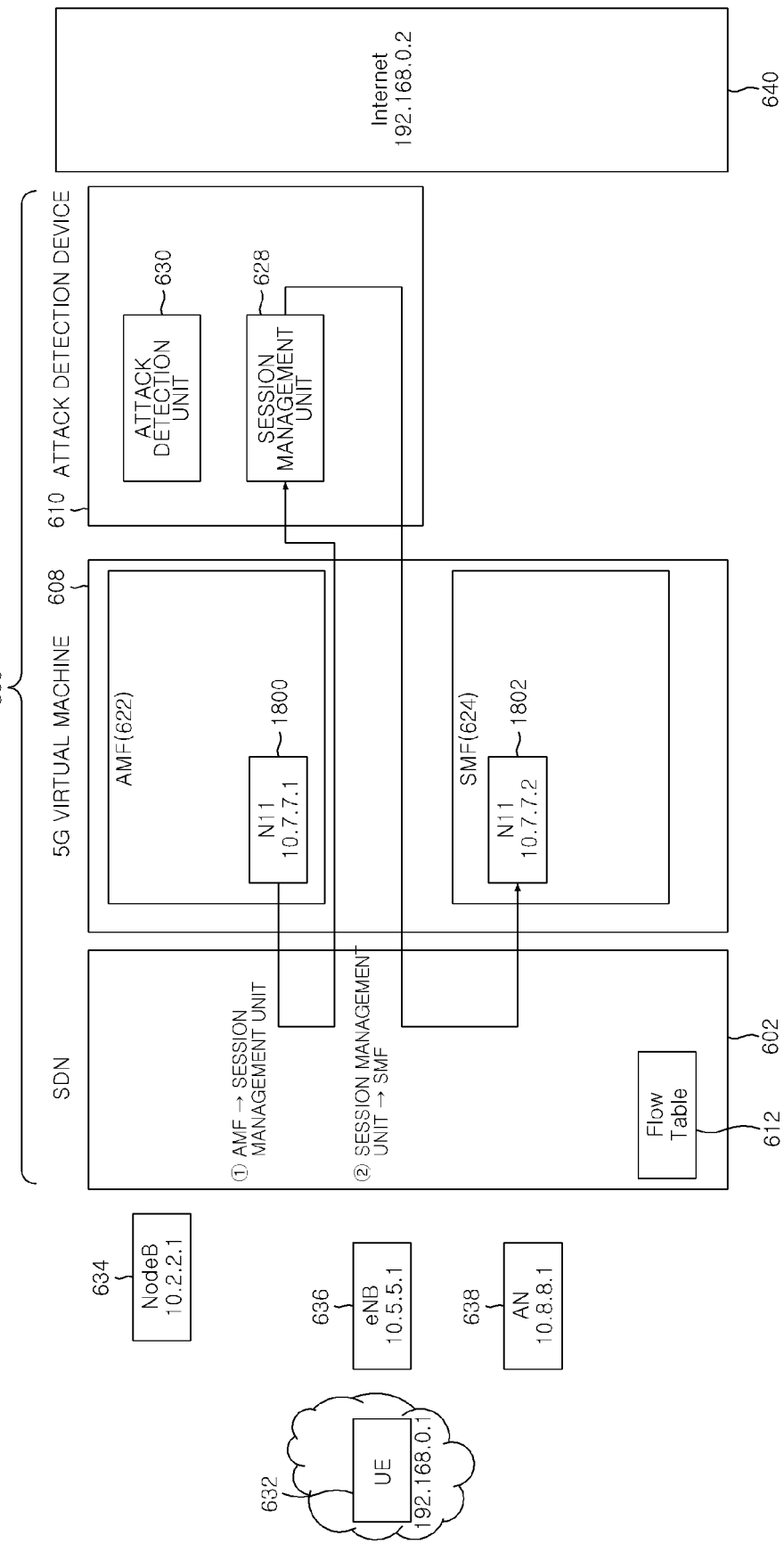
FIG. 18 illustrates an operation in packet flow from an AMF to an SMF in 5G according to the first embodiment of the present disclosure.

FIG. 18 illustrates an operation in packet flow from an AMF to an SMF in 5G according to the first embodiment of the present disclosure, which illustrates an N11 section from the AMF 622 to the SMF 624.

① When the AMF 622 requests session information from the SMF 624 or when the AMF 622 returns session information in response to a session information request from the SMF 624, a corresponding packet is transmitted to the SDN 602 through an N11 interface 1800 of an AMF 622, and the SDN 602 transmits the received packet to the session management unit 628 according to an in_port flow configuration with a condition that an IP of an SMF N11 interface 1802 is a destination IP.

② The session management unit 628 collects session information from the packet received through the SDN 602, and transmits the packet to the SDN 602. The SDN 602 transmits the received packet to the N11 interface 1802 of an SMF 624 according to the in_port flow configuration with the condition that the IP of the SMF N11 interface 1802 is the destination IP.

Figure 19:
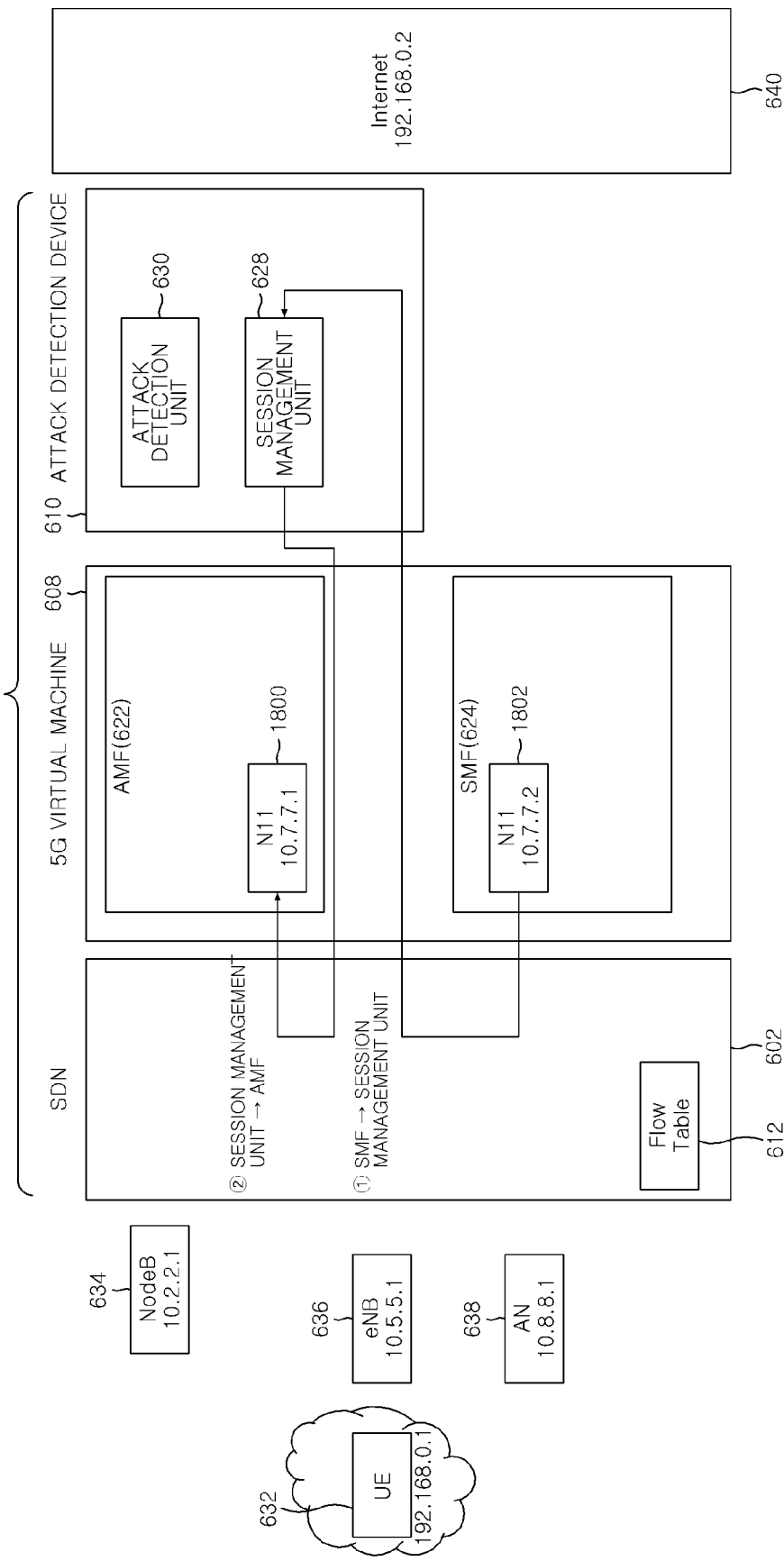
FIG. 19 illustrates an operation in packet flow from an SMF to an AMF in 5G according to the first embodiment of the present disclosure.

FIG. 19 illustrates an operation in packet flow from an SMF to an AMF in 5G according to the first embodiment of the present disclosure, which illustrates an N11 section from the SMF 624 to the AMF 622.

① When the SMF 624 requests session information from the AMF 622 or when the SMF 624 returns session information in response to a session information request from the AMF 622, a corresponding packet is transmitted to the SDN 602 through the N11 interface 1802 of the SMF 624, and the SDN 602 transmits the received packet to the session management unit 628 according to an in_port flow configuration with a condition that an IP of the AMF N11 interface 1800 IP is a destination IP.

② The session management unit 628 collects session information from the packet received through the SDN 602, and transmits the packet to the SDN 602. The SDN 602 transmits the received packet to the N11 interface 1800 of the AMF 622 according to the in_port flow configuration with the condition that the IP of the AMF N11 interface 1800 IP is the destination IP.

Figure 20:
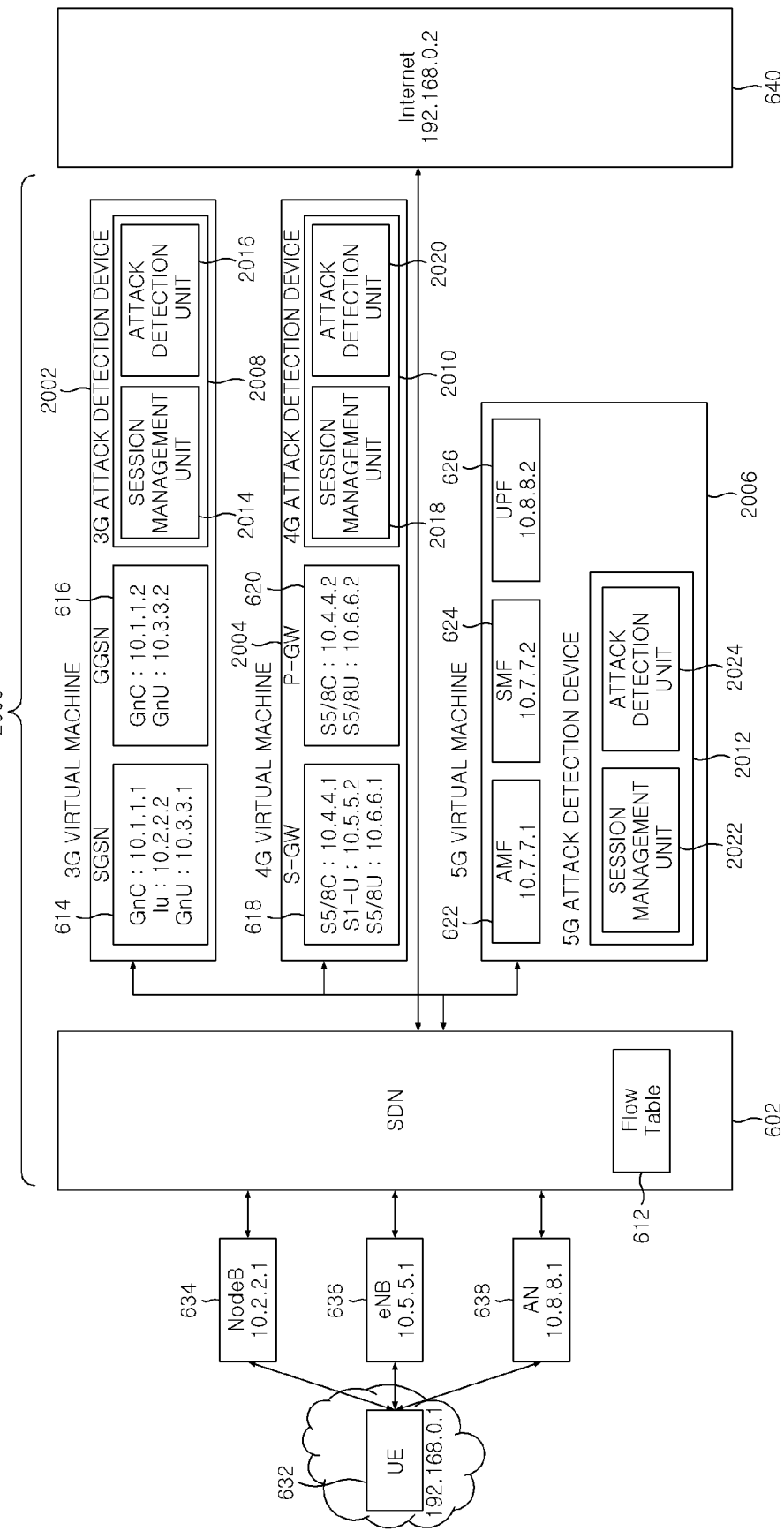
FIG. 20 illustrates a packet collection apparatus for virtualization core network session management according to a second embodiment of the present disclosure.

FIG. 20 illustrates a packet collection apparatus for virtualization core network session management according to a second embodiment of the present disclosure.

The packet collection apparatus 2000 for virtualization core network session management according to the second embodiment of the present disclosure illustrated in FIG. 20 has a configuration similar to that of the packet collection apparatus 600 for virtualization core network session management according to the first embodiment of the present disclosure illustrated in FIG. 6.

The two apparatuses are different in that the packet collection apparatus 600 for virtualization core network session management according to the first embodiment of the present disclosure illustrated in FIG. 6 includes one attack detection device 610, while the packet collection apparatus 2000 for virtualization core network session management according to the second embodiment of the present disclosure illustrated in FIG. 20 includes a 3G attack detection device 2008 for a 3G virtual machine 2002, a 4G attack detection device 2010 for a 4G virtual machine 2004, and a 5G attack detection device 2012 for a 5G virtual machine 2006.

Figure 21:
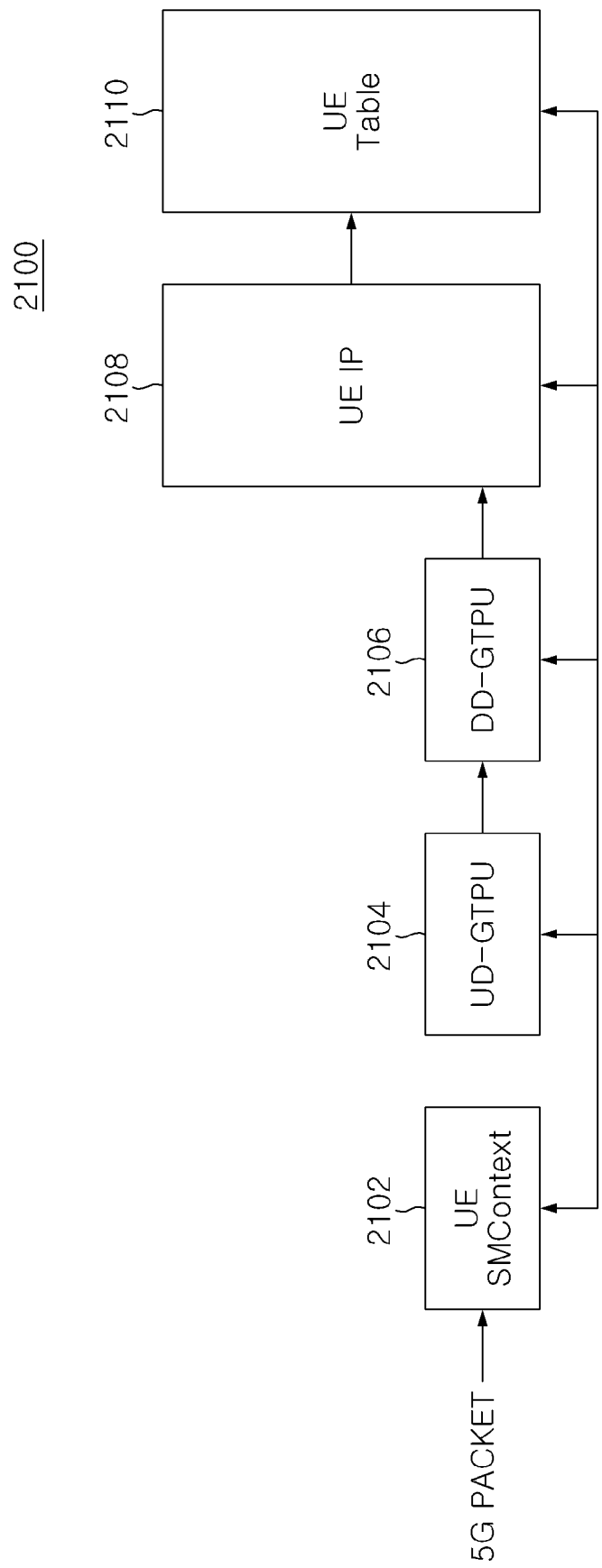
FIG. 21 is a detailed block diagram of a session management unit included in a 5G attack detection device in the packet collection apparatus for virtualization core network session management according to the second embodiment of the present disclosure.

FIG. 21 is a detailed block diagram of a session chain 2100 formed by a session management unit 2022 included in the 5G attack detection device 2012 in the packet collection apparatus 2000 for virtualization core network session management according to the second embodiment of the present disclosure.

The session chain 2100 may include a UE session management context chain 2102 that stores a UE session management context by each session, based on an input 5G session-related packet, an uplink data-GTPU chain 2104 that stores uplink data by each session, a downlink data-GTPU chain 2106 that stores downlink data by each session, a UE IP chain 2108 that stores a UE IP by each session, and a UE table chain 2110 that stores UE-related data by each session.

Figure 22:
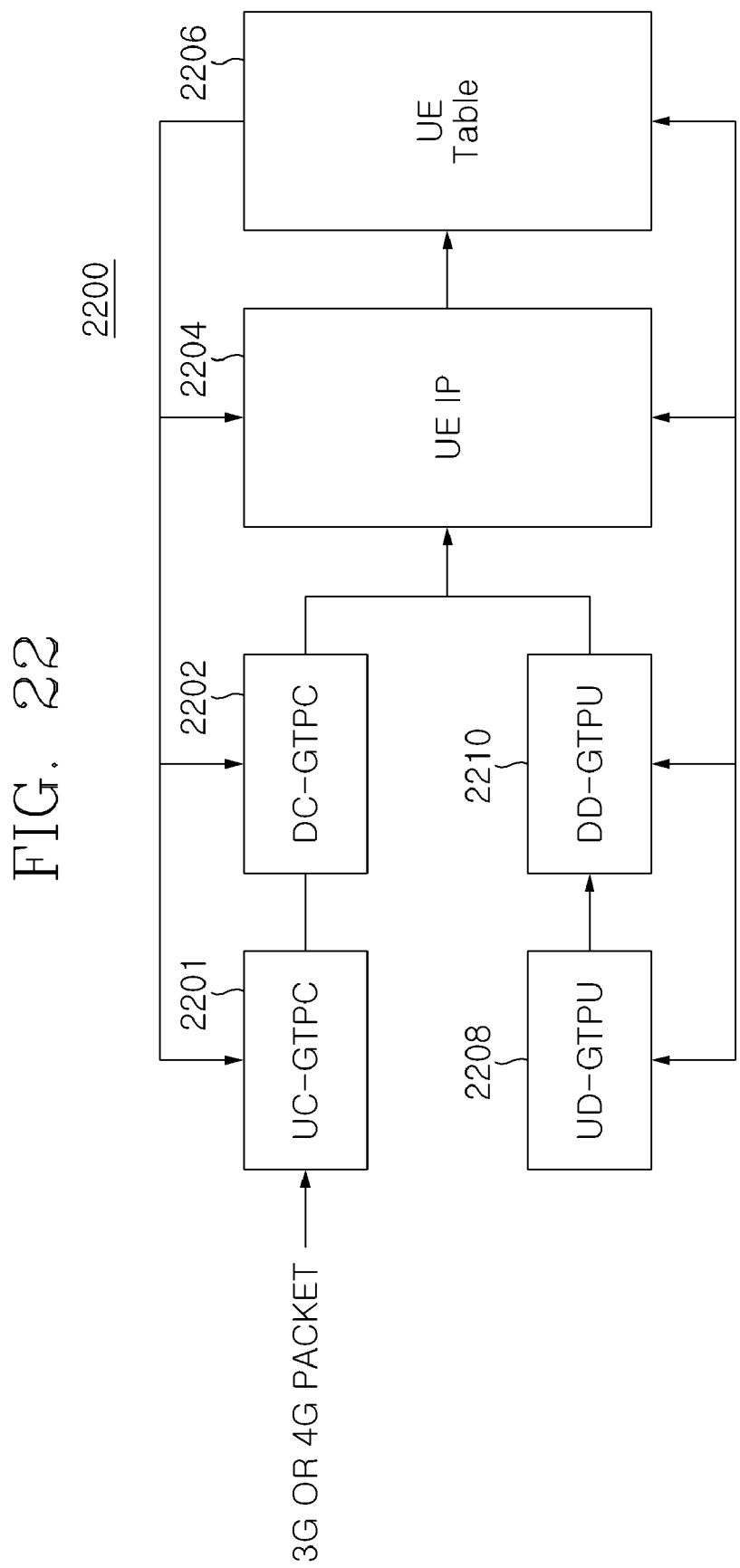
FIG. 22 is a detailed block diagram of a session management unit included in each of a 3G attack detection device and a 4G attack detection device in the packet collection apparatus for virtualization core network session management according to the second embodiment of the present disclosure.

FIG. 22 is a detailed block diagram of a session chain 2200 formed by session management units 2014 and 2018 included respectively in the 3G attack detection device 2008 and the 4G attack detection device 2010 in the packet collection apparatus 2000 for virtualization core network session management according to the second embodiment of the present disclosure.

The session chain 2200 includes an uplink control-GTPC chain 2201 that stores uplink control-related data by each session, based on an input 3G or 4G session-related packet, a downlink control-GTPC chain 2202 that stores downlink control-related data by each session, a UE IP chain 2204 that stores a UE IP by each session, a UE table chain 2206 that stores UE-related data by each session, an uplink data-GTPU chain 2208 that stores uplink data by each session, and a downlink data-GTPU chain 2210 that stores downlink data by each session.

FIG. 23 illustrates a flow configuration of a flow table 612 included in SDN 602 in the packet collection apparatus 2000 for virtualization core network session management according to the second embodiment of the present disclosure.

In the flow table 612, a flow between an SGSN 614, a GGSN 616, and the session management unit 2014 included in the 3G virtual machine 2002, a flow between the SGSN 614, the GGSN 616, and an attack detection unit 2016 included in the 3G virtual machine 2002, a flow between an S-GW 618, a P-GW 620, and the session management unit 2018 included in the 4G virtual machine 2004, a flow between the S-GW 618, the P-GW 620, and an attack detection unit 2020 included in the 4G virtual machine 2004, a flow between an AMF 622, an SMF 624, and the session management unit 2022 included in the 5G virtual machine 2006, and a flow between a base station (AN) 638 and a UPF 626 and the attack detection unit 2024 included in the 5G virtual machine 2006 may be defined based on an input port of the SDN 602, an output port of the SDN 602, a source of a packet, and a destination of the packet.

An operation of the packet collection apparatus 2000 for virtualization core network session management according to the second embodiment of the present disclosure will be described in detail with reference to the accompanying drawings.

Figure 24:
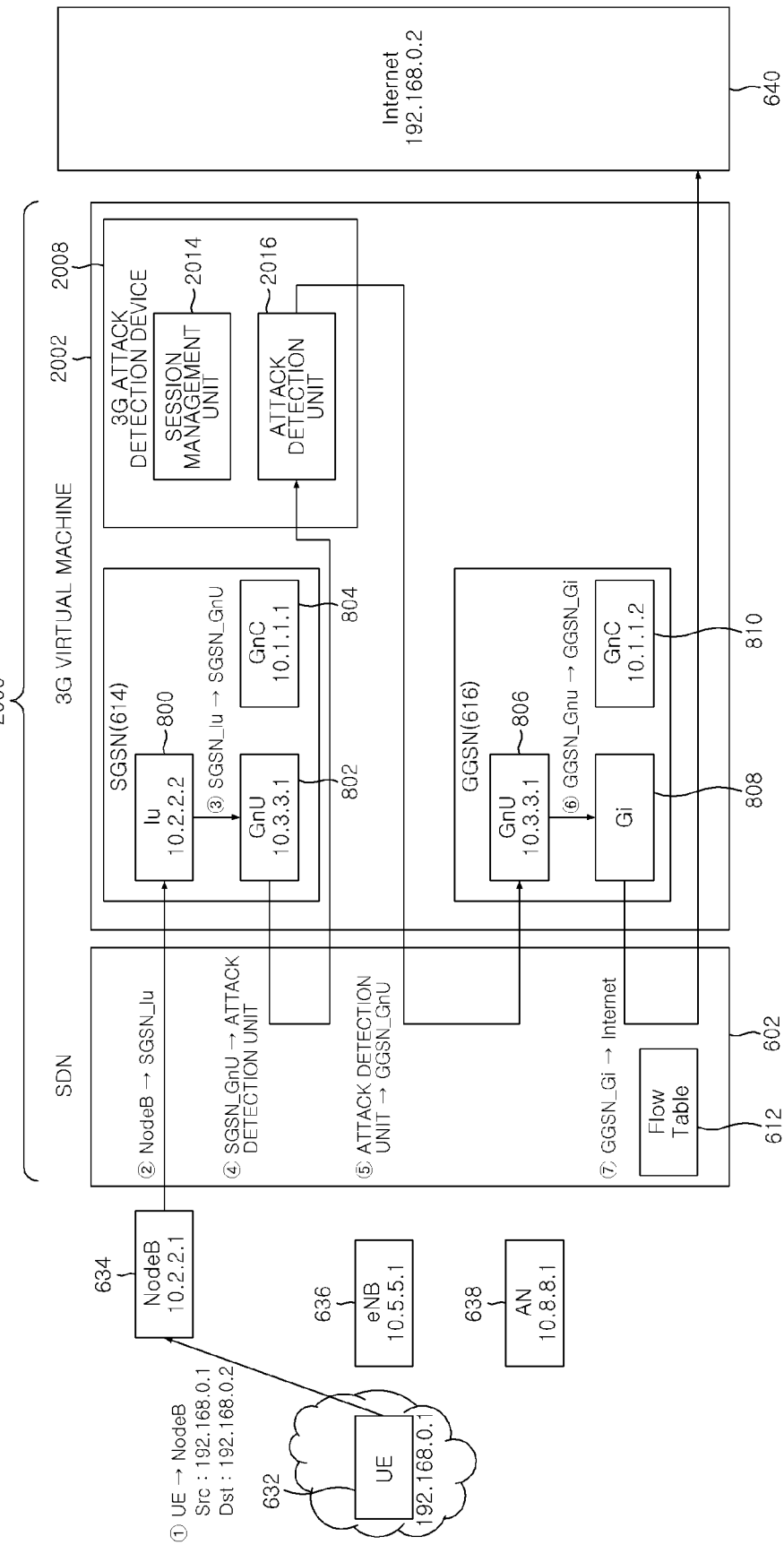
FIG. 24 illustrates an operation in packet flow from a UE to an Internet in 3G according to the second embodiment of the present disclosure.

FIG. 24 illustrates an operation in packet flow from a UE to an Internet in 3G according to the second embodiment of the present disclosure, which illustrates a GnU section from the SGSN 614 to the GGSN 616.

① When a UE 632 connects to the Internet, a GTP-U packet transmitted from the SGSN 614 to the GGSN 616 is entered through a network interface card (NIC) of a system, and then ② the SDN 602 transmits the packet to an Iu interface 800 of an SGSN 614 according to a flow configuration with a condition that an IP of the SGSN Iu interface 800 is a destination IP.

③ The SGSN 614 transmits the received packet to the SDN 602 through a GnU interface 802, and ④ the SDN 602 transmits the transmitted packet to the attack detection unit 2016 according to an in_port flow configuration with a condition that an IP of a GGSN GnU interface 806 is a destination IP.

⑤ The attack detection unit 2016 detects a pattern from a payload of the packet received through the SDN 602, and transmits the packet to the SDN 602. The SDN 602 transmits the received packet to the GnU interface 806 of a GGSN 616 according to the in_port flow configuration with the condition that the IP of the GGSN GnU interface 806 is the destination IP. ⑥ The GGSN 616 transmits the received packet to the SDN 602 through a Gi interface 808, and ⑦ the SDN 602 transmits the received packet to the Internet 640 through the NIC (not shown).

Figure 25:
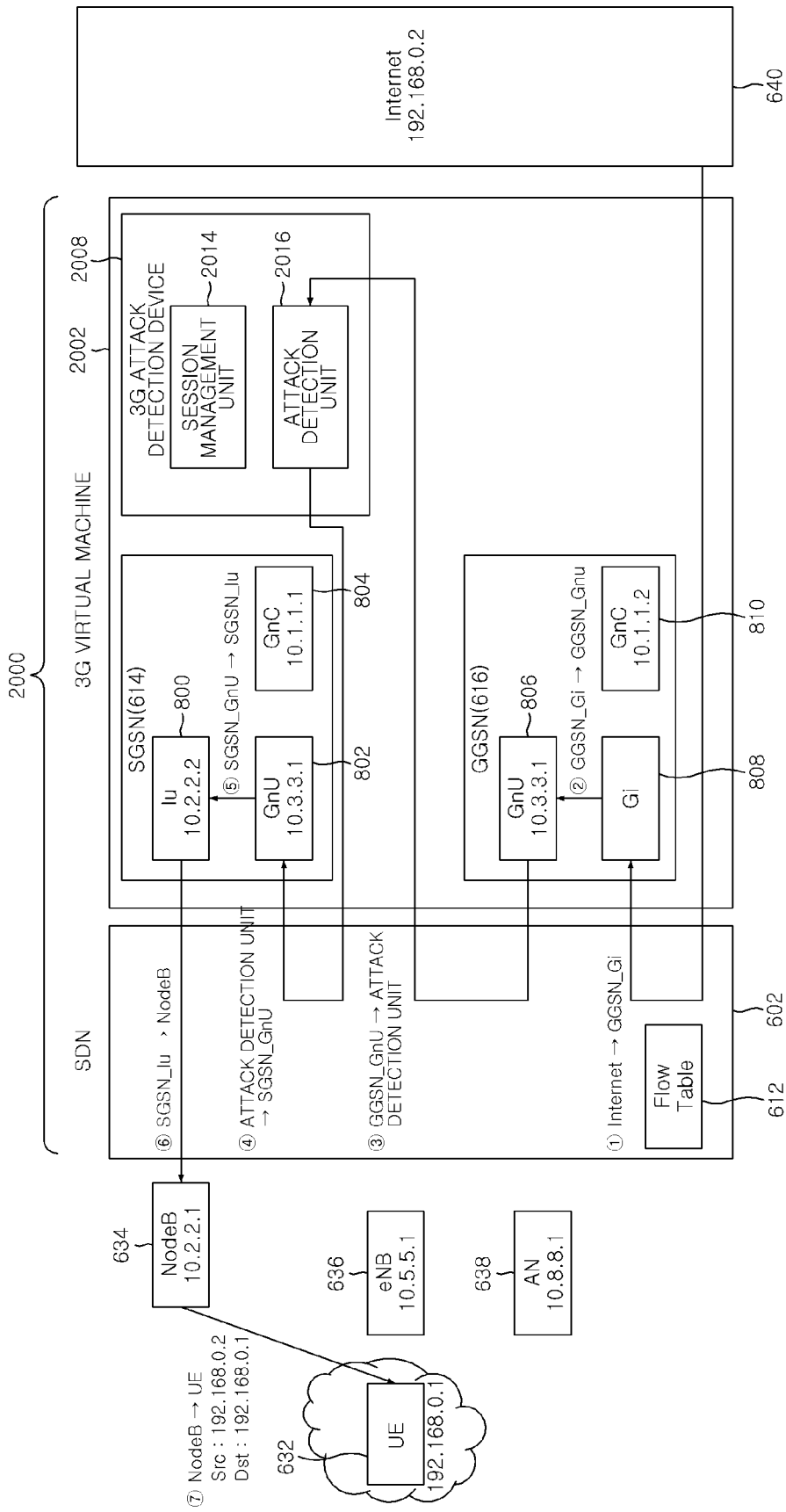
FIG. 25 illustrates an operation in packet flow from an Internet to a UE in 3G according to the second embodiment of the present disclosure.

FIG. 25 illustrates an operation in packet flow from an Internet to a UE in 3G according to the second embodiment of the present disclosure, which illustrates a GnU section from the GGSN 616 to the SGSN 614.

① When the UE 632 connects to the Internet, as a response packet, a GTP-U packet transmitted from the GGSN 616 to the SGSN 614 is entered through the network interface card (NIC) of the system, and then the SDN 602 transmits the packet to the Gi interface 808 of the GGSN 616 according to an in_port flow configuration with a condition that an IP of the GGSN Gi interface 808 is a destination IP.

② The GGSN 616 transmits the received packet to the SDN 602 through the GnU interface 806, and ③ the SDN 602 transmits the received packet to the attack detection unit 2016 according to an in_port flow configuration with a condition that an IP of the SGSN GnU interface 802 IP is a destination IP.

④ The attack detection unit 2016 detects a pattern from a payload of the packet received through the SDN 602, and transmits the packet to the SDN 602. The SDN 602 transmits the received packet to the GnU interface 802 of the SGSN 614 according to the in_port flow configuration with the condition that the IP of SGSN GnU interface 802 is the destination IP.

⑤ The SGSN 614 transmits the received packet to the SDN 602 through the Iu interface 800, and ⑥ the SDN 602 transmits the received packet to a NodeB 634 through the NIC. ⑦ The NodeB 634 transmits the transmitted packet to the UE 632.

Figure 26:
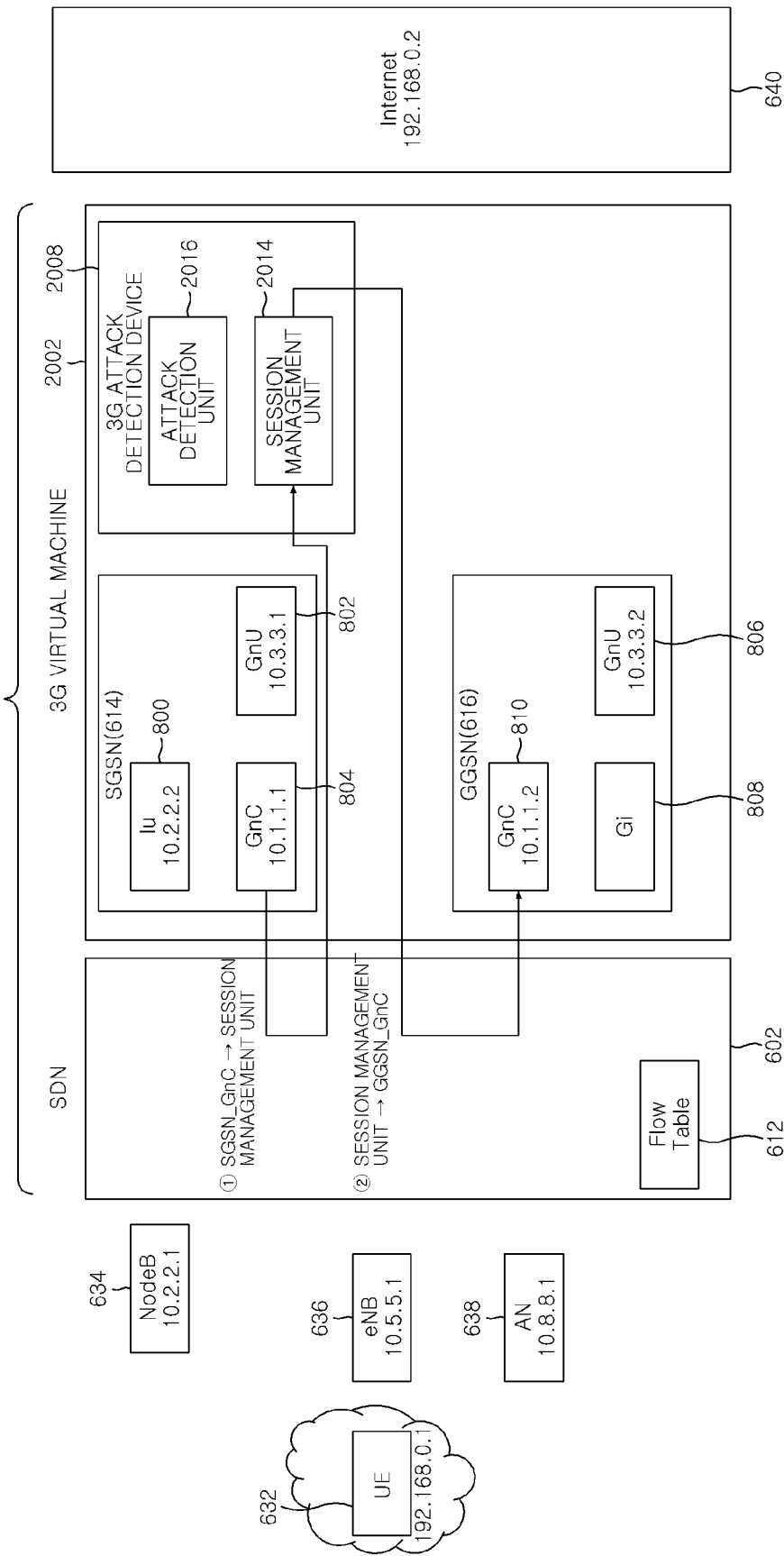
FIG. 26 illustrates an operation in packet flow from an SGSN to a GGSN in 3G according to the second embodiment of the present disclosure.

FIG. 26 illustrates an operation in packet flow from an SGSN to a GGSN in 3G according to the second embodiment of the present disclosure, which illustrates a GnC section from the SGSN 614 to the GGSN 616.

① When the SGSN 614 requests session information from the GGSN 616 or when the SGSN 614 returns session information in response to a session information request from the GGSN 616, a corresponding packet is transmitted to the SDN 602 through a GnC interface 804 of the SGSN 614, and the SDN 602 transmits the received packet to the session management unit 2014 according to an in_port flow configuration with a condition that an IP of a GGSN GnC interface 810 is a destination IP.

② The session management unit 2014 collects session information from the packet received through the SDN 602, and transmits the packet to the SDN 602. The SDN 602 transmits the received packet to the GnC interface 810 of the GGSN 616 according to the in_port flow configuration with the condition that the IP of the GGSN GnC interface 810 is the destination IP.

Figure 27:
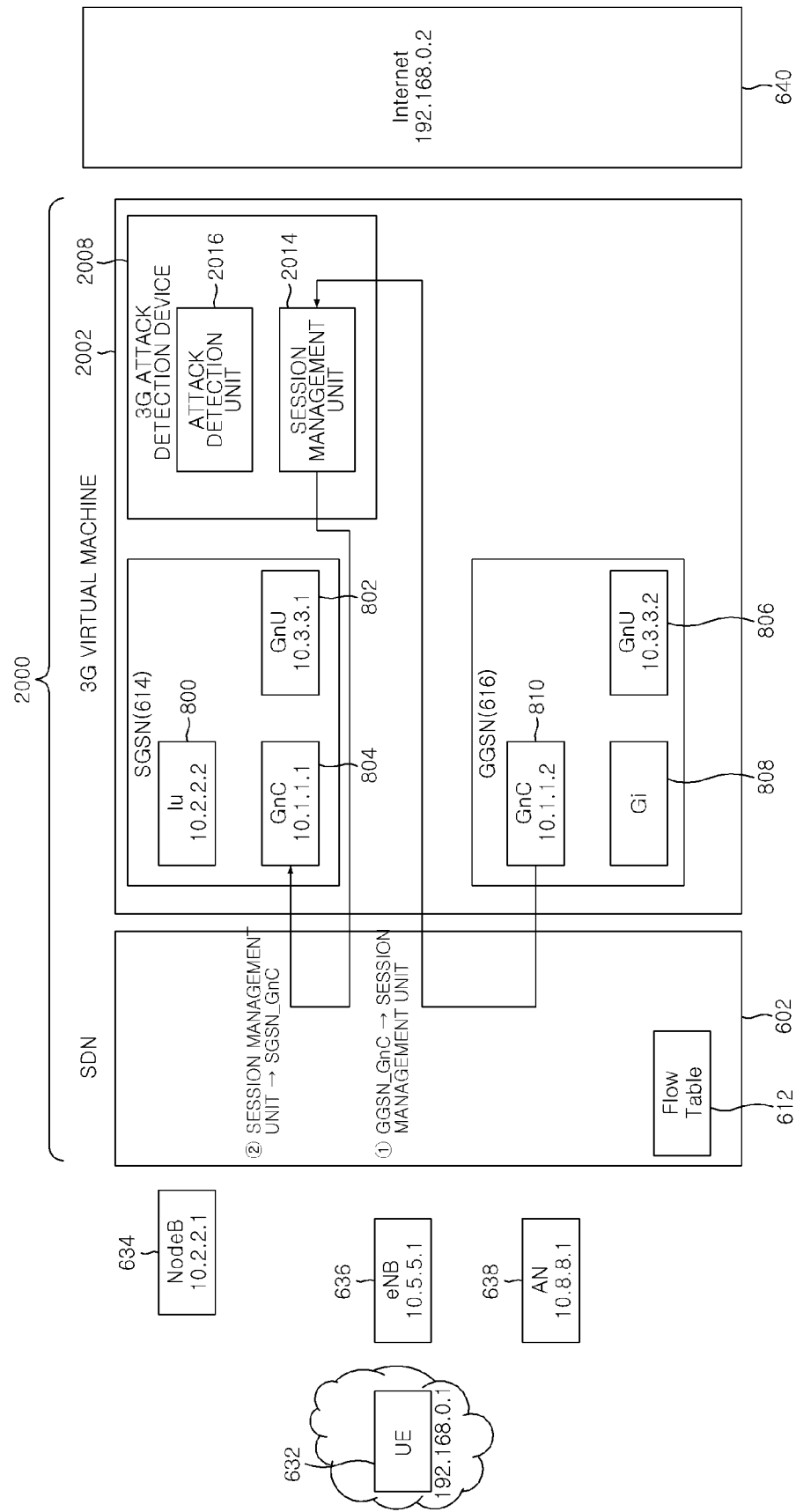
FIG. 27 illustrates an operation in packet flow from a GGSN to an SGSN in 3G according to the second embodiment of the present disclosure.

FIG. 27 illustrates an operation in packet flow from a GGSN to an SGSN in 3G according to the second embodiment of the present disclosure, which illustrates a GnC section from the GGSN 616 to the SGSN 614.

①When the GGSN 616 requests session information from the SGSN 614 or when the GGSN 616 returns session information in response to a session information request from the SGSN 614, a corresponding packet is transmitted to the SDN 602 through the GnC interface 810 of the GGSN 616, and the SDN 602 transmits the received packet to the session management unit 2014 according to an in_port flow configuration with a condition that an IP of the SGSN GnC interface 804 is a destination IP.

②The session management unit 2014 collects session information from the packet received through SDN 602, and transmits the packet to the SDN 602. The SDN 602 transmits the received packet to the GnC interface 804 of the SGSN 614 according to the in_port flow configuration with the condition that the IP of the SGSN GnC interface 804 is the destination IP.

Figure 28:
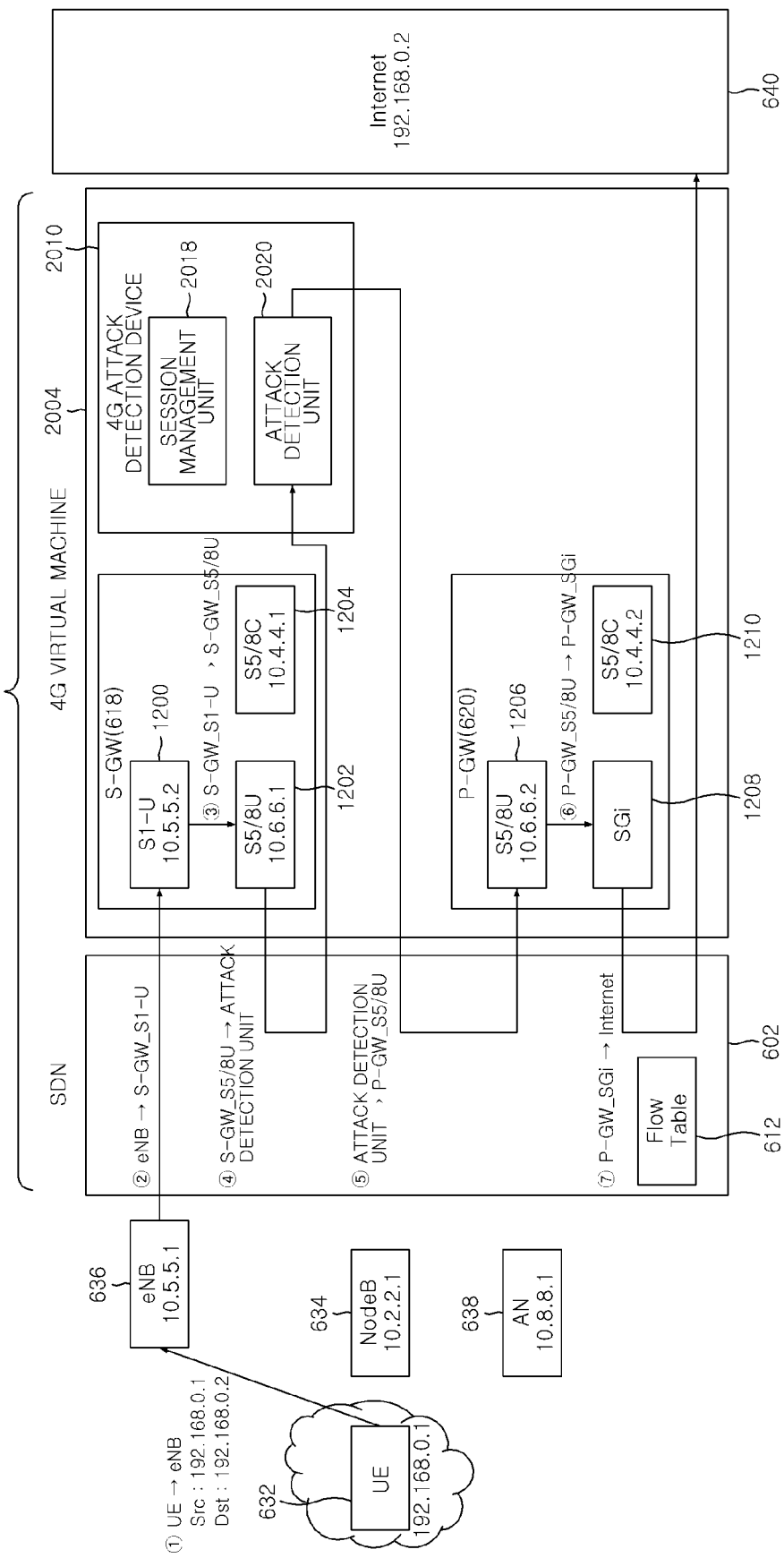
FIG. 28 illustrates an operation in packet flow from a UE to an Internet in 4G according to the second embodiment of the present disclosure.

FIG. 28 illustrates an operation in packet flow from a UE to an Internet in 4G according to the second embodiment of the present disclosure, which illustrates an S5/8U section from the S-GW 618 to the P-GW 620.

①When the UE 632 connects to the Internet, a GTP-U packet transmitted from the S-GW 618 to the P-GW 620 is entered through the NIC of the system, and then ②the SDN 602 transmits the packet to an S1-U interface 1200 of a S-GW 618 according to an in_port flow with a condition that an IP of the S-GW S1-U interface 1200 is a destination IP.

③The S-GW 618 transmits the received packet to the SDN 602 through an S5/8U interface 1202, and ④the SDN 602 transmits the received packet to the attack detection unit 2020 according to an in_port flow configuration with a condition that an IP of a P-GW S5/8U interface 1206 is a destination IP.

⑤The attack detection unit 2020 detects a pattern from a payload of the packet received through the SDN 602, and transmits the packet to the SDN 602. The SDN 602 transmits the received packet to the S5/8U interface 1206 of a P-GW 620 according to the in_port flow configuration with the condition that the IP of the P-GW S5/8U interface 1206 is the destination IP.

⑥The P-GW 620 transmits the received packet to the SDN 602 through an SGi interface 1208, and ⑦the SDN 602 transmits the received packet to the Internet 640 through the NIC.

Figure 29:
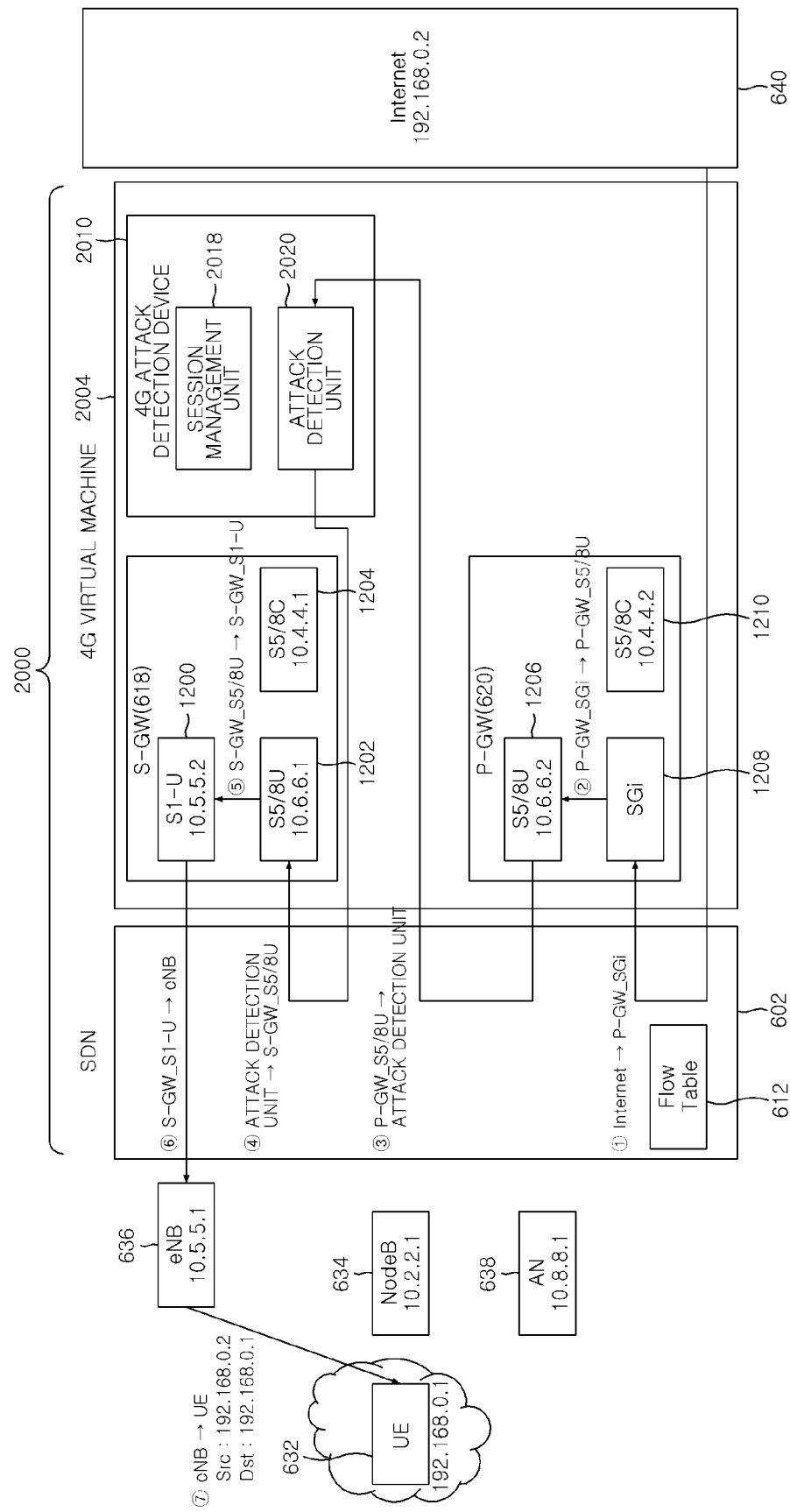
FIG. 29 illustrates an operation in packet flow from an Internet to a UE in 4G according to the second embodiment of the present disclosure.

FIG. 29 illustrates an operation in packet flow from an Internet to a UE in 4G according to the second embodiment of the present disclosure, which illustrates an S5/8U section from the P-GW 620 to the S-GW 618.

①When the UE 632 connects to the Internet, as a response packet, a GTP-U packet transmitted from the P-GW 620 to the S-GW 618 is entered through the NIC of the system, and then ②the SDN 602 transmits the packet to the SGi interface 1208 of the P-GW 620 according to an in_port flow configuration with a condition that an IP of the P-GW SGi interface 1208 is a destination IP.

③The P-GW 620 transmits the received packet to the SDN 602 through the S5/8U interface 1206, and the SDN 602 transmits the received packet to the attack detection unit 2020 according to an in_port flow configuration with a condition that an IP of the S-GW S5/8U interface 1202 is a destination IP.

④The attack detection unit 2020 detects a pattern from a payload of the packet received through the SDN 602, and transmits the packet to the SDN 602. The SDN 602 transmits the received packet to the S5/8U interface 1202 of the S-GW 618 according to the in_port flow configuration with the condition that the IP of the S-GW S5/8U interface 1202 is the destination IP.

⑤The S-GW 618 transmits the received packet to the SDN 602 through the S1-U interface 1200, and ⑥the SDN 602 transmits the received packet to an eNB 636 through the NIC. ⑦The eNB 636 transmits the received packet to the UE 632.

Figure 30:
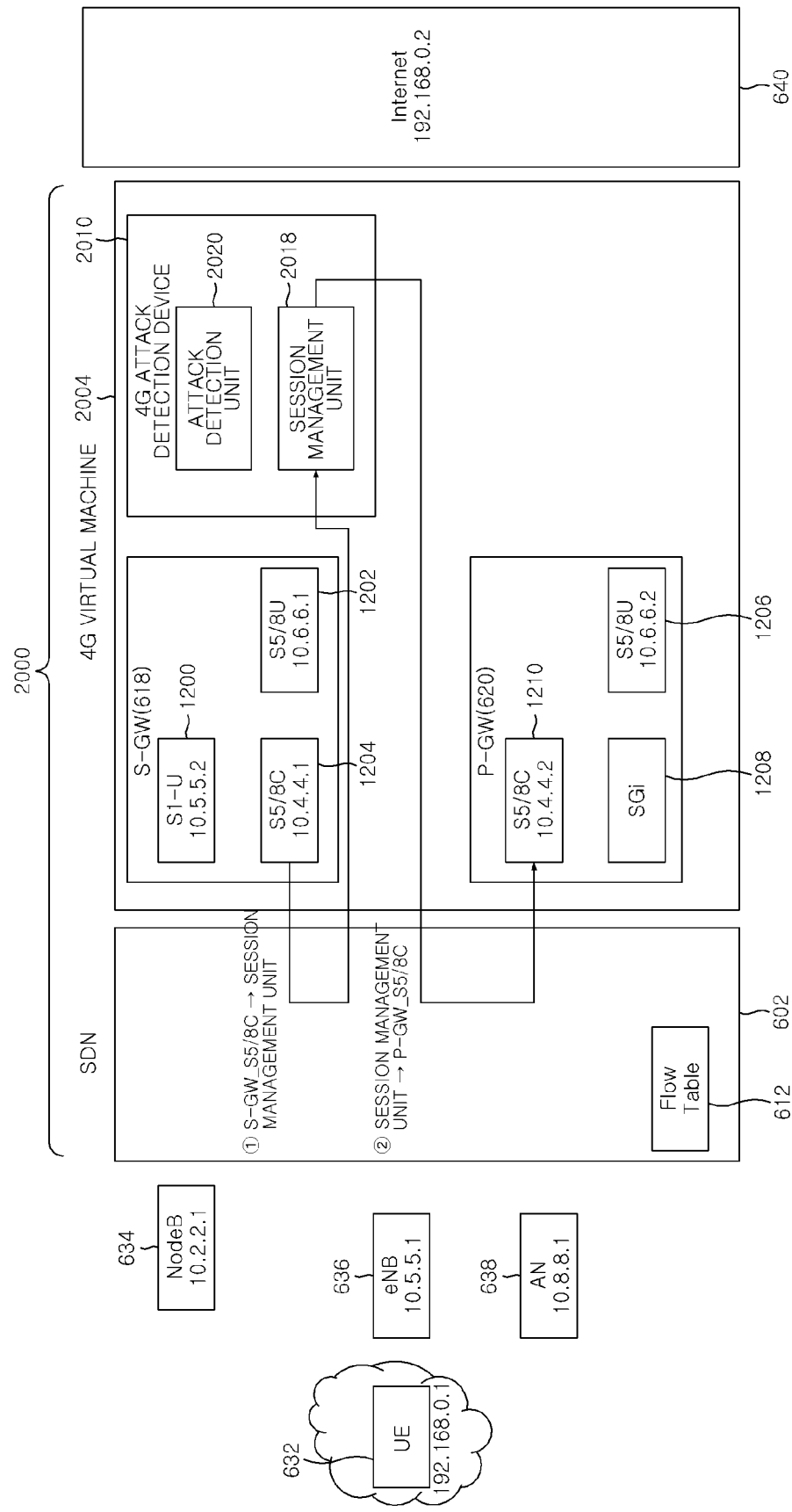
FIG. 30 illustrates an operation in packet flow from an S-GW to a P-GW in 4G according to the second embodiment of the present disclosure.

FIG. 30 illustrates an operation in packet flow from an S-GW to a P-GW in 4G according to the second embodiment of the present disclosure, which illustrates an S5/8C section from the S-GW 618 to the P-GW 620.

①When the S-GW 618 requests session information from the P-GW 620 or when the S-GW 618 returns session information in response to a session information request from the P-GW 620, a corresponding packet is transmitted to the SDN 602 through an S5/8C interface 1204 of the S-GW 618, and the SDN 602 transmits the received packet to the session management unit 2018 according to an in_port flow configuration with a condition that an IP of a P-GW S5/8C interface 1210 is a destination IP.

②The session management unit 2018 collects session information from the packet received through the SDN 602, and transmits the packet to the SDN 602. The SDN 602 transmits the received packet to the S5/8C interface 1210 of the P-GW 620 according to the in_port flow configuration with the condition that the IP of the P-GW S5/8C interface 1210 is the destination IP.

Figure 31:
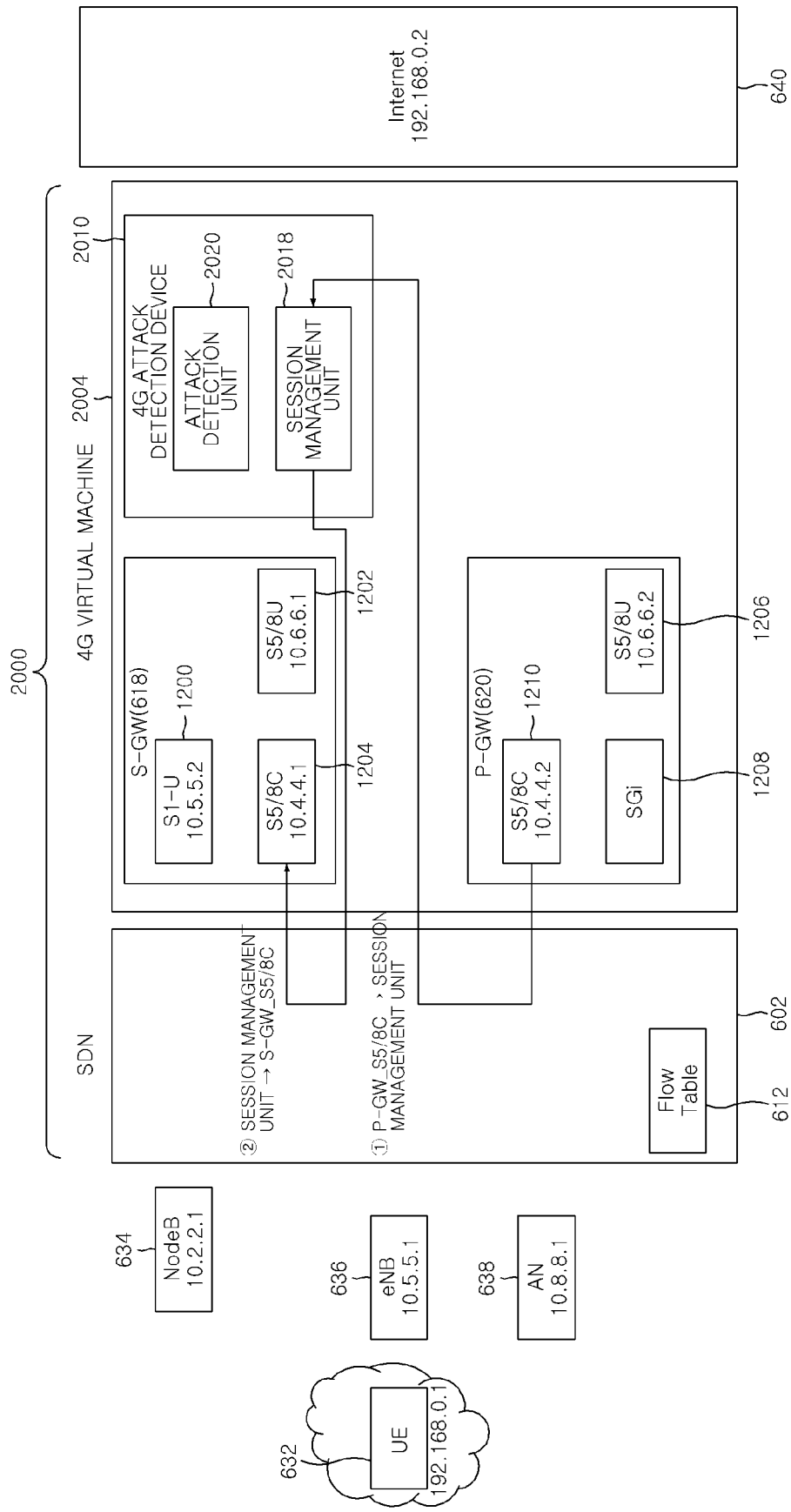
FIG. 31 illustrates an operation in packet flow from a P-GW to an S-GW in 4G according to the second embodiment of the present disclosure.

FIG. 31 illustrates an operation in packet flow from a P-GW to an S-GW in 4G according to the second embodiment of the present disclosure, which illustrates an S5/8C section from the P-GW 620 to the S-GW 618.

①When the P-GW 620 requests session information from the S-GW 618 or when the P-GW 620 returns session information in response to a session information request from the S-GW 618, a corresponding packet is transmitted to the SDN 602 through the S5/8C interface 1210 of the P-GW 620, and the SDN 602 transmits the received packet to the session management unit 2018 according to an in_port flow configuration with a condition that an IP of the S-GW S5/8C interface 1204 is a destination IP.

②The session management unit 2018 collects session information from the packet received through the SDN 602, and transmits the packet to the SDN 602. The SDN 602 transmits the received packet to the S5/8C interface 1204 of the S-GW 618 according to the in_port flow configuration with the condition that the IP of the S-GW S5/8C interface 1204 is the destination IP.

Figure 32:
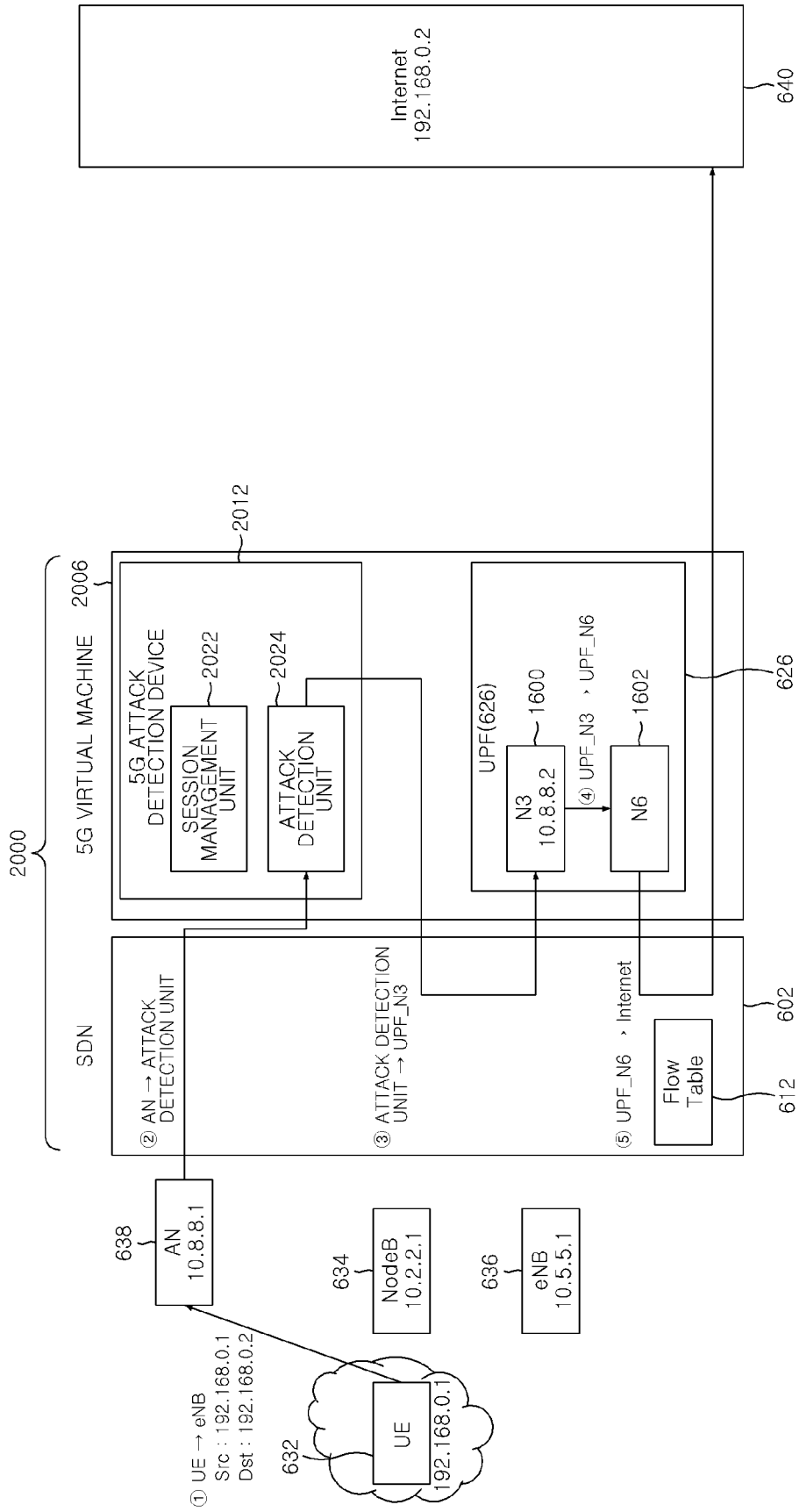
FIG. 32 illustrates an operation in packet flow from a UE to an Internet in 5G according to the second embodiment of the present disclosure.

FIG. 32 illustrates an operation in packet flow from a UE to an Internet in 5G according to the second embodiment of the present disclosure, which illustrates an N3 section from the AN 638 to the UPF 626.

①When the UE 632 connects to the Internet, a GTP-U packet transmitted from the AN 638 to the UPF 626 is entered through the NIC of the system, and then ②the SDN 602 transmits the packet to the attack detection unit 2024 according to an in_port flow with a condition that an IP of a UPF N3 interface 1600 is a destination IP.

③The attack detection unit 2024 detects a pattern from a payload of the packet received through the SDN 602, and transmits the packet to the SDN 602. The SDN 602 transmits the received packet to the N3 interface 1600 of a UPF 626 according to the flow configuration with the condition that the IP of the UPF N3 interface 1600 is the destination IP.

④ The UPF 626 transmits the transmitted packet to the SDN 602 through an N6 interface 1602, and ⑤ the SDN 602 transmits the received packet to the Internet 640 through the NIC.

Figure 33:
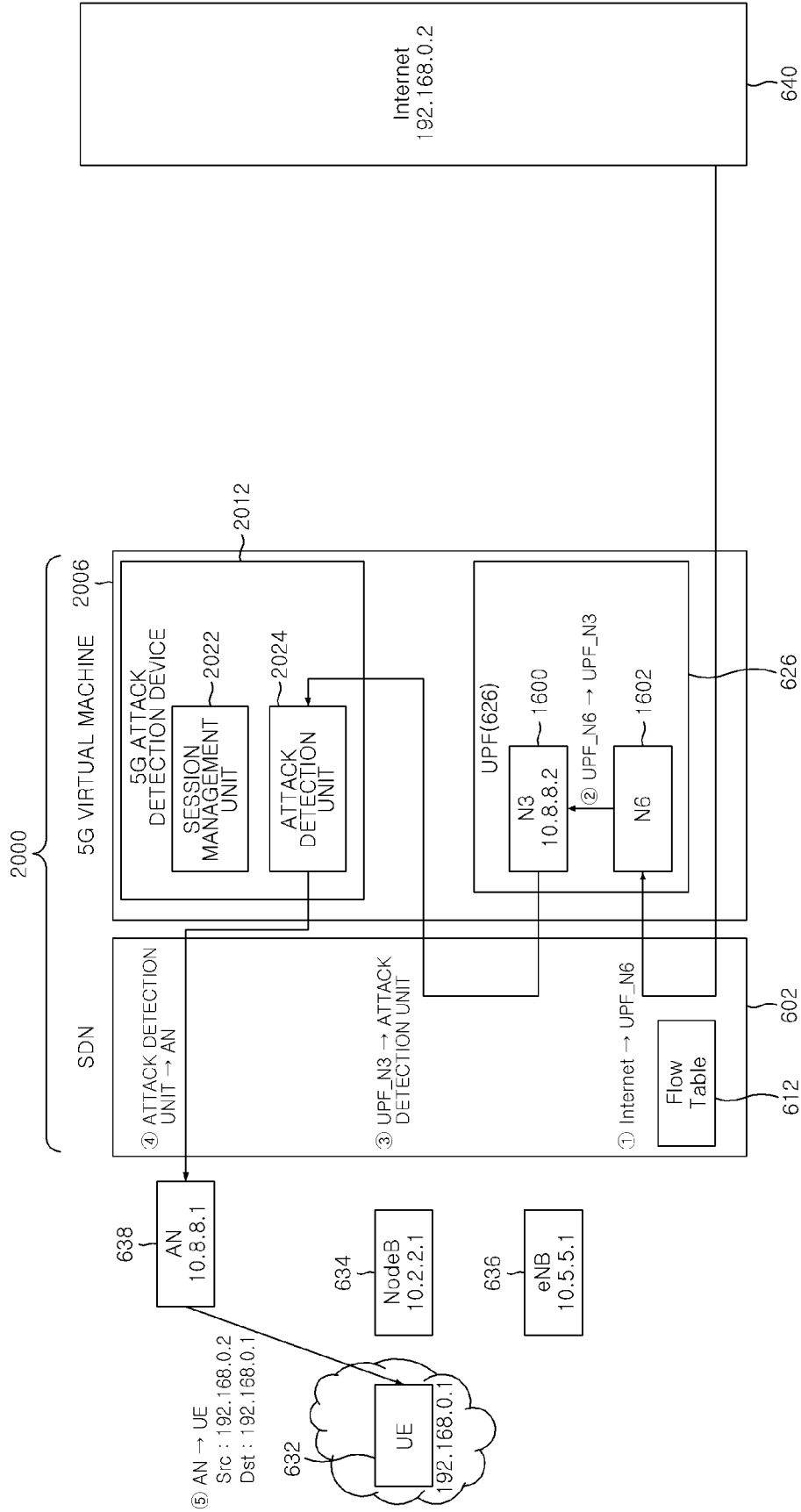
FIG. 33 illustrates an operation in packet flow from an Internet to a UE in 5G according to the second embodiment of the present disclosure.

FIG. 33 illustrates an operation in packet flow from an Internet to a UE in 5G according to the second embodiment of the present disclosure, which illustrates an N3 section from the UPF 626 to the AN 638.

① When the UE 632 connects to the Internet, as a response packet, a GTP-U packet transmitted from the UPF 626 to the AN 638 is entered through the NIC of the system, and then the SDN 602 transmits the packet to the N6 interface 1602 of the UPF 626 according to a flow configuration with a condition that an IP of the UPF N6 interface 1602 is a destination IP.

② The UPF 626 transmits the received packet to the SDN 602 through the N3 interface 1600, and ③ the SDN 602 transmits the received packet to the attack detection unit 2024 according to an in_port flow configuration with a condition that an IP of an AN N3 interface 638 is a destination IP.

④ The attack detection unit 2024 detects a pattern from a payload of the packet received through the SDN 602, and transmits the packet to the SDN 602. The SDN 602 transmits the transmitted packet to the N3 interface 638 of an AN 638 according to the in_port flow configuration with the condition that the IP of the AN N3 interface 638 is the destination IP.

⑤ The AN 638 transmits the received packet to the UE 632.

Figure 34:
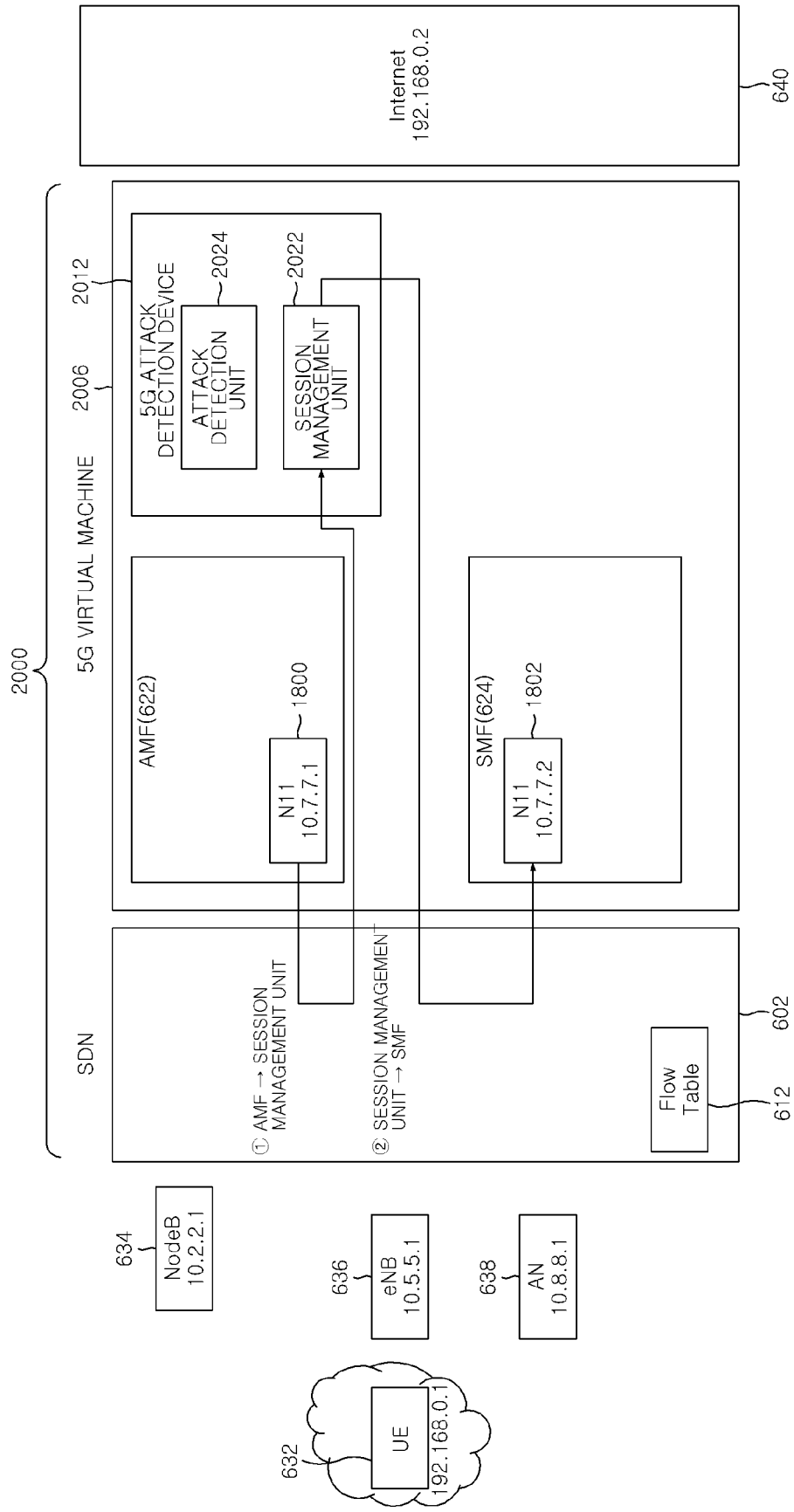
FIG. 34 illustrates an operation in packet flow from an AMF to an SMF in 5G according to the second embodiment of the present disclosure.

FIG. 34 illustrates an operation in packet flow from an AMF to an SMF in 5G according to the second embodiment of the present disclosure, which illustrates an N11 section from the AMF 622 to the SMF 624.

① When the AMF 622 requests session information from the SMF 624 or when the AMF 622 returns session information in response to a session information request from the SMF 624, a corresponding packet is transmitted to the SDN 602 through an N11 interface 1800 of an AMF 622, and the SDN 602 transmits the received packet to the session management unit 2022 according to an in_port flow configuration with a condition that an IP of an SMF N11 interface 1802 is a destination IP.

② The session management unit 2022 collects session information from the packet received through the SDN 602, and transmits the packet to the SDN 602. The SDN 602 transmits the received packet to the N11 interface 1802 of an SMF 624 according to the in_port flow configuration with the condition that the IP of the SMF N11 interface 1802 is the destination IP.

Figure 35:
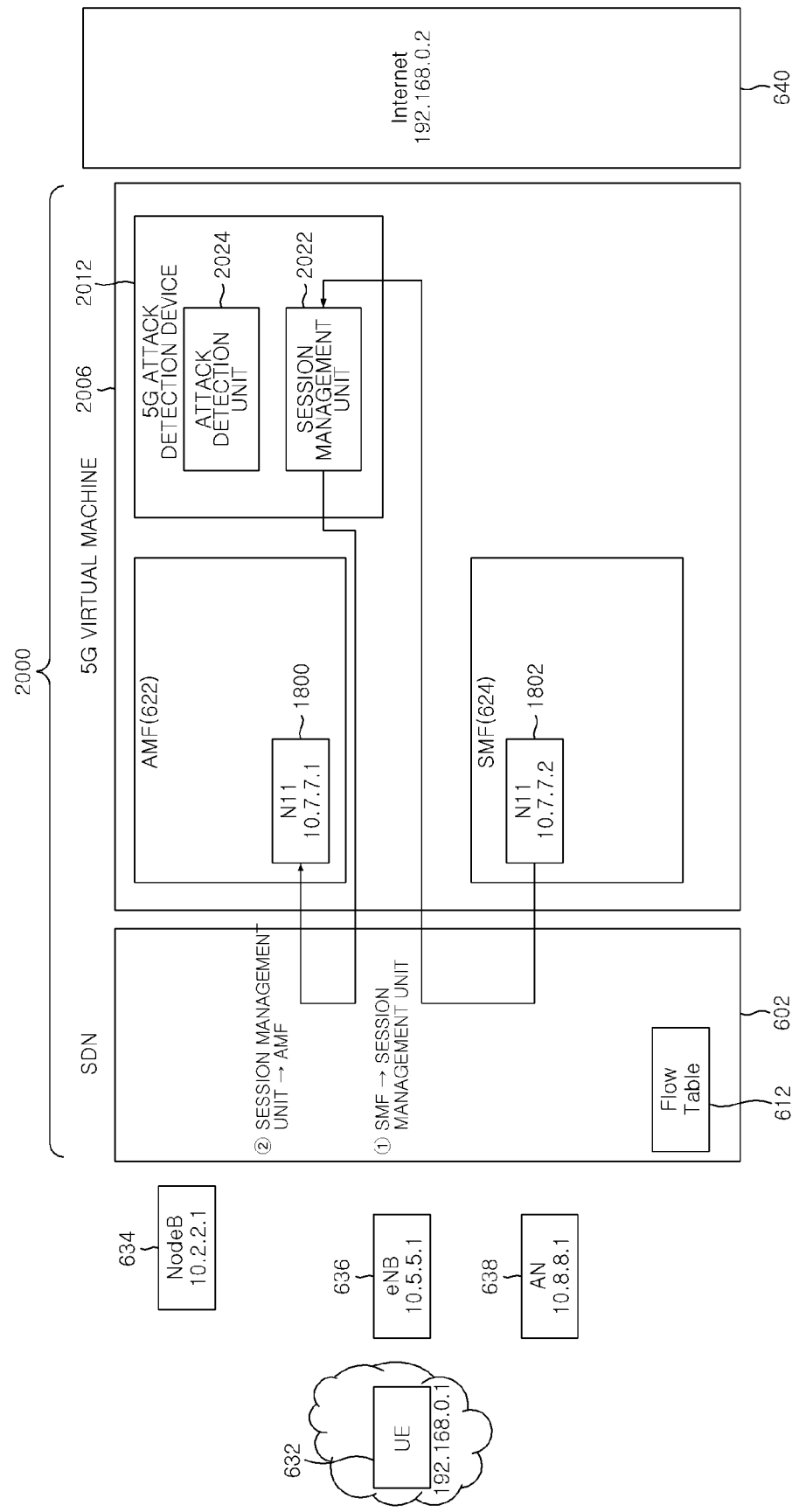
FIG. 35 illustrates an operation in packet flow from an SMF to an AMF in 5G according to the second embodiment of the present disclosure.

FIG. 35 illustrates an operation in packet flow from an SMF to an AMF in 5G according to the second embodiment of the present disclosure, which illustrates an N11 section from the SMF 624 to the AMF 622.

① When the SMF 624 requests session information from the AMF 622 or when the SMF 624 returns session information in response to a session information request from the AMF 622, a corresponding packet is transmitted to the SDN 602 through the N11 interface 1802 of the SMF 624, and the SDN 602 transmits the received packet to the session management unit 2022 according to an in_port flow configuration with a condition that an IP of the AMF N11 interface 1800 IP is a destination IP.

② The session management unit 2022 collects session information from the packet received through the SDN 602, and transmits the packet to the SDN 602. The SDN 602 transmits the received packet to the N11 interface 1800 of the AMF 622 according to the in_port flow configuration with the condition that the IP of the AMF N11 interface 1800 IP is the destination IP.

Figure 36:
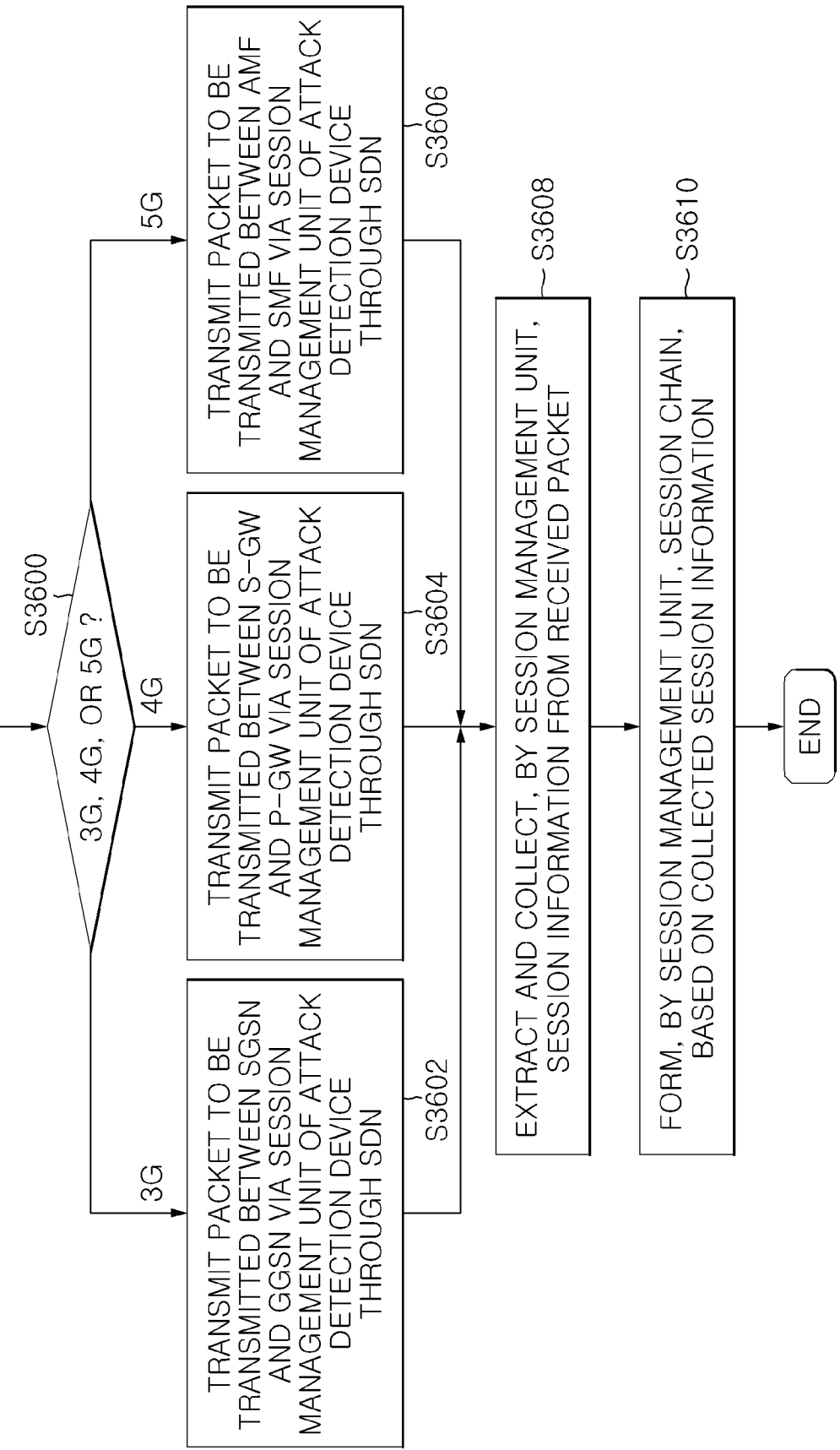
FIG. 36 is a flowchart illustrating a session information collection-related method of a packet collection method for virtualization core network session management according to an embodiment of the present disclosure.

FIG. 36 is a flowchart illustrating a session information collection-related method of a packet collection method for virtualization core network session management according to an embodiment of the present disclosure.

The packet collection method for virtualization core network session management according to the embodiment of the present disclosure may include an operation (operations S3602, S3604, and S3606) of transmitting a control-related packet to be transmitted via a session management unit 512 of an attack detection device 504 through software-defined networking (SDN) 505 when transmission of the control-related packet occurs in a mobile communication virtual machine 502, an operation (operation S3608) of the session management unit 512 extracting and collecting session information from the control-related packet received through the SDN 505, and an operation (operation S3610) of the session management unit 512 forming a session chain, based on the collected session information.

Referring to FIG. 36, in operation S3600, whether an input packet is a packet for 3G, 4G, or 5G is determined. SDN 602 may determine whether an input packet is a packet for 3G, 4G, or 5G, based on an IP address of the input packet.

In operation S3602, a 3G virtual machine 604 transmits a control-related packet to be transmitted between an SGSN 614 and a GGSN 616 via a session management unit 628 of an attack detection device 610 through the SDN 602.

The control-related packet to be transmitted between the SGSN 614 and the GGSN 616 may include a packet of a GnC section.

In operation S3604, a 4G virtual machine 606 transmits a control-related packet to be transmitted between an S-GW 618 and a P-GW 620 via the session management unit 628 of the attack detection device 610 through the SDN 602.

The control-related packet to be transmitted between the S-GW 618 and the P-GW 620 may include a packet of an S5/8C section.

In operation S3606, a 5G virtual machine 608 transmits a control-related packet to be transmitted between an AMF 622 and an SMF 624 via the session management unit 628 of the attack detection device 610 through the SDN 602.

The control-related packet to be transmitted between the AMF 622 and the SMF 624 may include a packet of an N11 section.

In operation S3608, the session management unit 628 extracts and collects session information from the control-related packet received through the SDN 602.

In operation S3610, the session management unit 628 forms a session chain, based on the collected session information.

FIG. 37 is a flowchart illustrating a pattern detection-related method of a packet collection method for virtualization core network session management according to an embodiment of the present disclosure.

The pattern detection-related method of the packet collection method for virtualization core network session management according to the embodiment of the present disclosure in FIG. 37 may include an operation (operations S3702, S3704, and S3706) of transmitting a user data-related packet to be transmitted via an attack detection unit 514 of the attack detection device 504 through SDN 505 when transmission of the user data-related packet occurs in a mobile communication virtual machine 502 and an operation (operation S3708) of the attack detection unit 514 detecting a pattern from a payload of the packet received through the SDN 505.

Referring to FIG. 37, in operation S3700, whether an input packet is a packet for 3G, 4G, or 5G is determined. SDN 602 may determine whether an input packet is a packet for 3G, 4G, or 5G, based on an IP address of the input packet.

In operation S3702, a 3G virtual machine 604 transmits a user data-related packet to be transmitted between an SGSN 614 and a GGSN 616 via an attack detection unit 630 of an attack detection device 610 through the SDN 602.

The user data-related to be transmitted between the SGSN 614 and the GGSN 616 may include a packet of a GnU section.

In operation S3704, a 4G virtual machine 606 transmits a user data-related packet to be transmitted between an S-GW 618 and a P-GW 620 via the attack detection unit 630 of the attack detection device 610 through the SDN 602.

The user data-related packet to be transmitted between the S-GW 618 and the P-GW 620 may include a packet of an S5/8U section.

In operation S3706, a 5G virtual machine 608 transmits a user data-related packet to be transmitted between a base station 638 and a UPF 626 via the attack detection unit 630 of the attack detection device 610 through the SDN 602.

The user data-related packet to be transmitted between the base station 638 and the UPF 626 may include a packet of an N3 section.

In operation S3708, the attack detection unit 630 detects a pattern from a payload of the packet received through the SDN 602.

The present disclosure described above can be realized as a computer-readable code in a medium recording a program. A computer-readable medium may keep storing a computer-executable program or may temporarily store the computer-executable program for execution or download. Further, the medium may include various recording devices or storage devices in a form in which a single piece or a plurality of pieces of hardware is combined and may be distributed on a network without being limited to a medium directly connected to a computer system. Examples of the medium may include those configured to store a program instruction including a magnetic medium, such as a hard disk, a floppy disk, and a magnetic tape, an optical recording medium, such as a CD-ROM and a DVD, a magneto-optical medium, such as a floptical disk, a ROM, a RAM, a flash memory, and the like. In addition, other examples of the medium may include an app store that distributes applications, a site that supplies or distributes various types of software, and a recording medium or a storage medium managed by a server. Therefore, the above detailed description should not be construed as restrictive in all aspects and should be considered as illustrative. The scope of the present disclosure should be determined based on reasonable interpretation of the appended claims, and all changes and modifications within the equivalent scope of the present disclosure are included in the scope of the present disclosure.

The present disclosure is not limited to the embodiments described above and the appended drawings. It will be obvious to those skilled in the art to which the present disclosure pertains that a component according to the present disclosure described above can be substituted, modified, or changed within the spirit and scope of the present disclosure.

What is claimed is:

1. A packet collection method for virtualization core network session management performed by a packet collection apparatus for virtualization core network session management, the packet collection method comprising:
    an operation (A) of transmitting a control-related packet to be transmitted via a session management unit of an attack detection device through software-defined networking (SDN) when transmission of the control-related packet occurs in a mobile communication virtual machine; and
    an operation (B) of the session management unit extracting and collecting session information from the control-related packet received through the SDN,
    wherein the mobile communication virtual machine comprises a 3G virtual machine, a 4G virtual machine, and a 5G virtual machine, and
    wherein the operation (A) comprises:
        an operation (A-1) of transmitting a control-related packet to be transmitted between a serving GPRS (general packet radio service) support node (SGSN) and a gateway GPRS support node (GGSN) of the 3G virtual machine via the session management unit of the attack detection device through the SDN;
        an operation (A-2) of transmitting a control-related packet to be transmitted between a serving gateway (S-GW) and a packet data network gateway (P-GW) of the 4G virtual machine via the session management unit of the attack detection device through the SDN; and
        an operation (A-3) of transmitting a control-related packet to be transmitted between an access and mobility management function (AMF) and a session management function (SMF) of the 5G virtual machine via the session management unit of the attack detection device through the SDN.

2. The packet collection method of claim 1, further comprising an operation (C) of the session management unit forming a session chain, based on the collected session information, after the operation (B).

3. The packet collection method of claim 2, wherein the session chain comprises:
    an uplink control-GTPC chain that stores uplink control-related data by each session, based on an input 3G or 4G session-related packet;
    a downlink control-GTPC chain that stores downlink control-related data by each session;
    a UE IP chain that stores a UE IP by each session;
    a UE table chain that stores UE-related data by each session;
    an uplink data-GTPU chain that stores uplink data by each session;
    a downlink data-GTPU chain that stores downlink data by each session; and
    a UE session management context chain that stores a UE session management context by each session, based on an input 5G session-related packet.

4. The packet collection method of claim 3, wherein the uplink control-GTPC chain, the downlink control-GTPC chain, the UE IP chain, the UE table chain, the uplink data-GTPU chain, the downlink data-GTPU chain, and the UE session management context chain are connected to each other so that a related session is retrieved through a UE IP or a UE session management context.

5. The packet collection method of claim 1, further comprising, after the operation (A-3):
  an operation (D) of, by the packet collection apparatus for virtualization core network session management, transmitting a user data-related packet to be transmitted via an attack detection unit of the attack detection device through the SDN when transmission of the user data-related packet occurs in the mobile communication virtual machine; and
  an operation (E) of the attack detection unit detecting a pattern from a payload of the packet received through the SDN.

6. The packet collection method of claim 5, wherein the operation (D) comprises:
  an operation (D-1) of transmitting a user data-related packet to be transmitted between the SGSN and the GGSN via the attack detection unit of the attack detection device through the SDN;
  an operation (D-2) of transmitting a user data-related packet to be transmitted between the S-GW and the P-GW via the attack detection unit of the attack detection device through the SDN; and
  an operation (D-3) of transmitting a user data-related packet to be transmitted between a base station and a user plane function (UPF) via the attack detection unit of the attack detection device through the SDN.

7. The packet collection method of claim 6, wherein the user data-related packet to be transmitted between the SGSN and the GGSN in the operation (D-1) comprises a packet of a GnU section,
  wherein the user data-related packet to be transmitted between the S-GW and the P-GW in the operation (D-2) comprises a packet of an S5/8U section, and
  wherein the user data-related packet to be transmitted between the base station and the UPF in the operation (D-3) comprises a packet of an N3 interface section.

8. The packet collection method of claim 5, wherein the SDN comprises a flow table in which a flow between the SGSN, the GGSN, and the session management unit, a flow between the SGSN, the GGSN, and the attack detection unit, a flow between the S-GW, the P-GW, and the session management unit, a flow between the S-GW, the P-GW, and the attack detection unit, a flow between the AMF, the SMF, and the session management unit, and a flow between a base station, a UPF, and the attack detection unit are defined based on an input port of the SDN, an output port of the SDN, a source of a packet, and a destination of the packet.

9. The packet collection method of claim 1, wherein the control-related packet to be transmitted between the SGSN and the GGSN in the operation (A-1) comprises a packet of a GnC section,
  wherein the control-related packet to be transmitted between the S-GW and the P-GW in the operation (A-2) comprises a packet of an S5/8C section, and
  wherein the control-related packet to be transmitted between the AMF and the SMF in the operation (A-3) comprises a packet of an N11 interface section.

10. A packet collection apparatus for virtualization core network session management comprising a mobile communication virtual machine, software-defined networking (SDN), and an attack detection device,
  wherein the packet collection apparatus for virtualization core network session management performs an operation (A) of transmitting a control-related packet to be transmitted via a session management unit of the attack detection device through the SDN when transmission of the control-related packet occurs in the mobile communication virtual machine, and
  wherein the session management unit included in the attack detection device performs an operation (B) of extracting and collecting session information from the control-related packet received through the SDN,
  wherein the mobile communication virtual machine comprises a 3G virtual machine, a 4G virtual machine, and a 5G virtual machine, and
  wherein the operation (A) comprises:
    an operation (A-1) of transmitting a control-related packet to be transmitted between a serving GPRS (general packet radio service) support node (SGSN) and a gateway GPRS support node (GGSN) of the 3G virtual machine via the session management unit of the attack detection device through the SDN;
    an operation (A-2) of transmitting a control-related packet to be transmitted between a serving gateway (S-GW) and a packet data network gateway (P-GW) of the 4G virtual machine via the session management unit of the attack detection device through the SDN; and
    an operation (A-3) of transmitting a control-related packet to be transmitted between an access and mobility management function (AMF) and a session management function (SMF) of the 5G virtual machine via the session management unit of the attack detection device through the SDN.

11. The packet collection apparatus of claim 10, wherein the session management unit further performs an operation (C) of forming a session chain, based on the collected session information, after the operation (B).

12. The packet collection apparatus of claim 11, wherein the session chain comprises:
  an uplink control-GTPC chain that stores uplink control-related data by each session, based on an input 3G or 4G session-related packet;
  a downlink control-GTPC chain that stores downlink control-related data by each session;
  a UE IP chain that stores a UE IP by each session;
  a UE table chain that stores UE-related data by each session;
  an uplink data-GTPU chain that stores uplink data by each session;
  a downlink data-GTPU chain that stores downlink data by each session; and
  a UE session management context chain that stores a UE session management context by each session, based on an input 5G session-related packet.

13. The packet collection apparatus of claim 12, wherein the uplink control-GTPC chain, the downlink control-GTPC chain, the UE IP chain, the UE table chain, the uplink data-GTPU chain, the downlink data-GTPU chain, and the UE session management context chain are connected to each other so that a related session is retrieved through a UE IP or a UE session management context.

14. The packet collection apparatus of claim 11, wherein, after the operation (A-3), the packet collection apparatus for virtualization core network session management further performs an operation (D) of transmitting a user data-related packet to be transmitted via an attack detection unit of the attack detection device through the SDN when transmission of the user data-related packet occurs in the mobile communication virtual machine, and
  wherein the attack detection unit further performs an operation (E) of detecting a pattern from a payload of the packet received through the SDN.

15. The packet collection apparatus of claim 14, wherein the operation (D) comprises:
- an operation (D-1) of transmitting a user data-related packet to be transmitted between the SGSN and the GGSN via the attack detection unit of the attack detection device through the SDN;
- an operation (D-2) of transmitting a user data-related packet to be transmitted between the S-GW and the P-GW via the attack detection unit of the attack detection device through the SDN; and
- an operation (D-3) of transmitting a user data-related packet to be transmitted between a base station and a user plane function (UPF) via the attack detection unit of the attack detection device through the SDN.

16. The packet collection apparatus of claim 15, wherein the user data-related packet to be transmitted between the SGSN and the GGSN in the operation (D-1) comprises a packet of a GnU section,
- wherein the user data-related packet to be transmitted between the S-GW and the P-GW in the operation (D-2) comprises a packet of an S5/8U section, and
- wherein the user data-related packet to be transmitted between the base station and the UPF in the operation (D-3) comprises a packet of an N3 interface section.

17. The packet collection apparatus of claim 14, wherein the SDN comprises a flow table in which a flow between the SGSN, the GGSN, and the session management unit, a flow between the SGSN, the GGSN, and the attack detection unit, a flow between the S-GW, the P-GW, and the session management unit, a flow between the S-GW, the P-GW, and the attack detection unit, a flow between the AMF, the SMF, and the session management unit, and a flow between a base station, a UPF, and the attack detection unit are defined based on an input port of the SDN, an output port of the SDN, a source of a packet, and a destination of the packet.

18. The packet collection apparatus of claim 10, wherein the control-related packet to be transmitted between the SGSN and the GGSN in the operation (A-1) comprises a packet of a GnC section,
- wherein the control-related packet to be transmitted between the S-GW and the P-GW in the operation (A-2) comprises a packet of an S5/8C section, and
- wherein the control-related packet to be transmitted between the AMF and the SMF in the operation (A-3) comprises a packet of an N11 interface section.

\* \* \* \* \*